(12) United States Patent
Konno et al.

(10) Patent No.: US 12,534,489 B2
(45) Date of Patent: Jan. 27, 2026

(54) IONIC SOLID

(71) Applicant: JAPAN SCIENCE AND TECHNOLOGY AGENCY, Kawaguchi (JP)

(72) Inventors: Takumi Konno, Toyonaka (JP); Naoto Kuwamura, Toyonaka (JP); Tatsuhiro Kojima, Toyonaka (JP); Nobuto Yoshinari, Toyonaka (JP)

(73) Assignee: JAPAN SCIENCE AND TECHNOLOGY AGENCY, Kawaguchi (JP)

( * ) Notice: Subject to any disclaimer, the term of this patent is extended or adjusted under 35 U.S.C. 154(b) by 174 days.

(21) Appl. No.: 17/605,897

(22) PCT Filed: Apr. 24, 2020

(86) PCT No.: PCT/JP2020/017733
§ 371 (c)(1),
(2) Date: Oct. 22, 2021

(87) PCT Pub. No.: WO2020/218527
PCT Pub. Date: Oct. 29, 2020

(65) Prior Publication Data
US 2022/0135607 A1     May 5, 2022

(30) Foreign Application Priority Data
Apr. 25, 2019  (JP) ................. 2019-083954

(51) Int. Cl.
| | | |
|---|---|---|
| *C07F 15/06* | (2006.01) | |
| *B01J 20/22* | (2006.01) | |
| *B01J 20/28* | (2006.01) | |
| *B01J 20/282* | (2006.01) | |
| *B01J 31/16* | (2006.01) | |
| *B01J 31/18* | (2006.01) | |
| *C07F 3/06* | (2006.01) | |
| *C07F 13/00* | (2006.01) | |
| *C07F 15/04* | (2006.01) | |
| *C07F 19/00* | (2006.01) | |

(52) U.S. Cl.
CPC ............ *C07F 15/06* (2013.01); *B01J 20/226* (2013.01); *B01J 20/2808* (2013.01); *B01J 20/28083* (2013.01); *B01J 20/282* (2013.01); *B01J 31/1691* (2013.01); *B01J 31/1845* (2013.01); *C07F 3/06* (2013.01); *C07F 13/00* (2013.01); *C07F 15/04* (2013.01); *C07F 19/00* (2013.01)

(58) Field of Classification Search
None
See application file for complete search history.

(56) References Cited

PUBLICATIONS

International Search Report issued on Jul. 21, 2020 in PCT/JP2020/017733 filed on Apr. 24, 2020, 1 page.

(Continued)

*Primary Examiner* — Yun Qian
(74) *Attorney, Agent, or Firm* — Oblon, McClelland, Maier & Neustadt, L.L.P.

(57) ABSTRACT

An ionic solid having pores may be useful for incorporating a substance therein. Such an ionic solid may have pores for incorporating a substance therein. The pores may be formed by a crystal lattice of a metal complex. A hydrophilic substance having a molecular weight of 60 or larger may be included in the pores. The hydrophilic substance may be selected from a polyhydric alcohol, a cyclic oligosaccharide, a saccharide, a sugar alcohol, and an amino acid. The hydrophilic substance may be a guest compound.

18 Claims, 12 Drawing Sheets

(56) References Cited

PUBLICATIONS

Surinwong et al., "An Extremely Porous Hydrogen-Bonded Framework Composed of D-Penicillaminato $Co^{III}{}_2Au^{I}{}_3$ Complex Anions and Aqua Cobalt(II) Cations: Formation and Stepwise Structural Transformation", Chemistry: An Asian Journal, 2016, vol. 11, No. 4, pp. 486-490 (15 total pages).

Surinwong et al., "A drastic change in the superhydrophilic crystal porosities of metallosupramolecular structures via a slight change in pH", Chemical Communications, 2016, vol. 52, pp. 12893-12896.

IONIC SOLID

CROSS-REFERENCE TO RELATED APPLICATIONS

The present application is the national stage of international application PCT/JP2020/017733, filed on Apr. 24, 2020, and claims the benefit of the filing date of Japanese Appl. No. 2019-083954, filed on Apr. 25, 2019, the content of each of which is incorporated by reference.

FIELD OF THE INVENTION

The present invention relates to an ionic solid.

For example, sodium chloride is known as an ionic solid present in the natural world. This ionic solid has a structure where positive and negative ions are attracted to each other through Coulomb's force (electrostatic force) to thereby be alternately arranged and densely bonded. The present inventors studied the structures of salts of ionic polynuclear metal complexes from the supramolecular chemical standpoint, and reported new types of ionic solids which differ from ionic solids present in the natural world, and exhibit spatial arrangement governed by non-Coulomb interaction.

Non Patent Literatures 1 and 2 state that: porosity, an index for porousness, varies drastically by slight difference in pH in producing crystals of a salt of a polynuclear metal complex $[Co_2Au_3(D\text{-pen-N,S})_6]^{3-}$, which has penicillamine as a ligand; and water vapor, carbon dioxide, or the like is adsorbed into the pores of the porous material.

The present inventors also filed patent applications as to non-Coulomb interaction ionic solids (Patent Literatures 1 and 2).

Patent Literature 1 describes a charge separation ionic solid wherein single crystals of a salt of a cationic polynuclear metal complex form cationic clusters, and the clusters of counter anions are accumulated in holes formed by the close-packed arrangement of the cationic clusters. This ionic solid differs from ionic solids present in the natural world, and has a crystal structure where charges of ionic clusters are separated through non-Coulomb force without pairing ions. Such a specific structure exhibits dielectric characteristic and exhibits a negative electrostrictive effect.

Patent Literature 2 describes an ionic solid wherein single crystals of a salt of an anionic polynuclear metal complex are accumulated to form a crystal lattice, and a cationic species is present in voids of the crystal lattice. For this ionic solid, it has been reported that a metal cation has high fluidity inside the ionic solid and has a function as an ion exchanger which is exchanged with an external metal cation. The fluidity of a cationic ion is difficult to reduce even if the ionic solid is formed into pellets.

CITATION LIST

Patent Literature

Patent Literature 1: International Publication No. WO 2018/56237

Patent Literature 2: International Publication No. WO 2018/79831

Non Patent Literature

Non Patent Literature 1: Chem. Asian J. 2016, 11, 486-490

Non Patent Literature 2: Chem. Commun., 2016, 52, 12893-12896

SUMMARY OF THE INVENTION

Technical Problem

An object of the present invention is to provide an ionic solid further having a new function.

Solution to Problem

The present inventors conducted various studies to impart a new function to the ionic solid described in Non Patent Literature 2, and consequently successfully developed a novel ionic solid in which a particular substance is incorporated in pores of a crystal lattice of the ionic solid described in Non Patent Literature 2. Further, the present inventors found that this ionic solid is useful as a material for an electrochemical device, a material providing a reaction field, a gas adsorbent material, a solvent vapor adsorbent material, a molecular recognition material, a metal ion exchanger, or an anion exchanger, etc.

The present invention provides the following [1] to [32].

[1] An ionic solid having pores for incorporating a substance therein.

[2] The ionic solid according to [1], wherein the pores are defined by a crystal lattice of a metal complex.

[3] The ionic solid according to [1] or [2], wherein one or more members selected from the group consisting of water, a polyacid, an inorganic salt, a metal ion, an oxo anion and a hydrophilic substance having a molecular weight of 60 or more are included in the pores.

[4] The ionic solid according to [3], wherein the hydrophilic substance is one or more members selected from the group consisting of a polyhydric alcohol having a molecular weight of 60 or more, a cyclic oligosaccharide having a molecular weight of 60 or more, a saccharide having a molecular weight of 60 or more, a sugar alcohol having a molecular weight of 60 or more, and an amino acid having a molecular weight of 60 or more.

[5] The ionic solid according to any one of [1] to [4], wherein the pores occupy 40% or more in the crystal lattice.

[6] The ionic solid according to any one of [1] to [5], wherein an opening size of the pores is from 0.5 to 5 nm.

[7] The ionic solid according to any one of [1] to [6], wherein the ionic solid is a material for an electrochemical device, a material providing a reaction field, a gas adsorbent material, a solvent vapor adsorbent material, a molecular recognition material, a metal ion exchanger, or an anion exchanger.

[8] A column packing material comprising an ionic solid according to any one of [1] to [7].

[9] A catalyst support comprising an ionic solid according to any one of [1] to [7].

[10] The ionic solid according to any one of [2] to [9], wherein in the metal complex, (A) an anionic metal complex and (B) a cationic species are arranged through a coordination bond or an ionic bond.

[11] The ionic solid according to [10], wherein the anionic metal complex (A) is an $M^1M^2$ pentanuclear complex anion in which two metals $M^1$ and three metals $M^2$ are bonded via one ligand, wherein the two metals $M^1$ are the same or different and are selected from the group consisting of group 9 elements in the periodic table, and the three metals $M^2$ are the same or different and are selected from the group consisting of group 11 elements in the periodic table.

[12] The ionic solid according to [11], wherein the ligand is an amino acid having a thiol group.

[13] The ionic solid according to any one of [10] to [12], wherein the anionic metal complex (A) is a metal complex of the following formula (1):

$$[(M^1)_d(M^2)_e(X^1)_f]^{k-} \quad (1)$$

wherein
each $M^1$ independently represents metal elements which are the same or different and are selected from the group consisting of group 9 elements in the periodic table,
each $M^2$ independently represents metal elements which are the same or different and are selected from the group consisting of group 11 elements in the periodic table,
$X^1$ represents an amino acid having a thiol group,
d represents a number from 0 to 4,
e represents a number from 0 to 4,
f represents a number from 1 to 8, and
k represents a number from 1 to 4,
provided that d and e are not 0 at the same time.

[14] The ionic solid according to any one of [10] to [13], wherein the cationic species (B) is a metal complex of the following formula (2):

$$A_a[(M^3)_l(X^2)_m]^{j+} \quad (2)$$

wherein
A represents an alkali metal ion or an alkaline earth metal ion,
$M^3$ represents a metal element selected from the group consisting of groups 9 and 12 in the periodic table,
each $X^2$ independently represents one or more members selected from the group consisting of water, ammine, diamine, a nitrite ion and carboxylate,
a represents a number from 0 to 10,
l represents a number from 0 to 1,
m represents a number from 1 to 6, and
j represents a number from 1 to 3,
provided that a and l are not 0 at the same time.

[15] The ionic solid according to any one of [10] to [14], wherein the cationic species (B) comprises a cationic metal complex.

[16] The ionic solid according to [15], wherein the cationic metal complex is one or more members selected from the group consisting of the following compound group α:

<Compound Group α>
$[Co(NH_3)_6]^{3+}$, $[Co(H_2O)(NH_3)_5]^{3+}$, $[Co(NO_2)(NH_3)_5]^{2+}$, $[Co(H_2O)_6]^{2+}$, $[Ni(H_2O)_6]^{2+}$, $[Mn(H_2O)_6]^{2+}$, $[Co(H_2O)_4]^{2+}$, $[Ni(H_2O)_4]^{2+}$, $[Mn(H_2O)_4]^{2+}$, $\{Li[Zn(OAc)_2]\}^+$, $\{Na[Zn(OAc)_2]\}$, $\{K[Zn(OAc)_2]\}^+$, $\{Cs[Zn(OAc)_2]\}^+$, $\{Na_2Cs_7[Zn(OAc)_2]\}^{9+}$, $\{Na_9[Zn(OAc)_2]\}^{9+}$, $[Co(en)_3]^{3+}$, $[Co(tn)_3]^{3+}$
provided that OAc represents an acetate ion, en represents ethylenediamine, and tn represents 1,3-diaminopropane.

[17] The ionic solid according to any one of [2] to [16], wherein the crystal lattice comprises a metal complex of the following formula (3):

$$[(M^1)_3(M^2)_2(X^1)_6]_2[(M^3)(X^2)_{m1}]_3 \cdot nH_2O \quad (3)$$

wherein
each $M^1$ independently represents metal elements which are the same or different and are selected from the group consisting of group 9 elements in the periodic table,
each $M^2$ independently represents metal elements which are the same or different and are selected from the group consisting of group 11 elements in the periodic table,
$M^3$ represents a metal element selected from the group consisting of groups 9 and 12 in the periodic table,
each $X^1$ independently represents an amino acid having a thiol group,
each $X^2$ independently represents one or more members selected from the group consisting of water, ammine, diamine and carboxylate,
m1 represents a number from 1 to 6, and
n represents a number from 1 to 100.

[18] The ionic solid according to any one of [2] to [16], wherein the crystal lattice comprises a metal complex of the following formula (4):

$$(A)_a[(M^1)_3(M^2)_2(X^1)_6]_b[(M^3)_1(X^2)_{m2}]_c \cdot nH_2O \quad (4)$$

wherein
each $M^1$ independently represents metal elements which are the same or different and are selected from the group consisting of group 9 elements in the periodic table,
each $M^2$ independently represents metal elements which are the same or different and are selected from the group consisting of group 11 elements in the periodic table,
$M^3$ represents a metal element selected from the group consisting of groups 9 and 12 in the periodic table,
each $X^1$ independently represents an amino acid having a thiol group,
each $X^2$ independently represents one or more members selected from the group consisting of water, ammine, diamine, a nitrite ion and carboxylate,
each A independently represents an alkali metal ion or an alkaline earth metal ion,
a represents a number from 0 to 10,
b represents a number from 1 to 3,
c represents a number from 1 to 3,
l represents a number from 0 to 1,
m2 represents a number from 1 to 6, and
n represents a number from 1 to 100,
provided that a and l are not 0 at the same time.

[19] The ionic solid according to any one of [2] to [16], wherein the crystal lattice comprises a metal complex of the following formula (5):

$$(A)_9[(M^1)_3(M^2)_2(X^1)_6]_3[(M^3)(X^2)_{m3}]_2 \cdot nH_2O \quad (5)$$

wherein
each $M^1$ independently represents metal elements which are the same or different and are selected from the group consisting of group 9 elements in the periodic table,
each $M^2$ independently represents metal elements which are the same or different and are selected from the group consisting of group 11 elements in the periodic table,
$M^3$ represents a metal element selected from the group consisting of groups 9 and 12 in the periodic table,
each $X^1$ independently represents an amino acid having a thiol group, each $X^2$ independently represents one or more members selected from the group consisting of water, ammine, diamine and carboxylate, each A independently represents an alkali metal ion or an alkaline earth metal ion, m3 represents a number from 1 to 6, and n represents a number from 1 to 100.

[20] The ionic solid according to any one of [2] to [19], wherein the ionic solid exhibits bulk ion conductivity.

[21] The ionic solid according to any one of [2] to [9], wherein the metal complex is a cationic polynuclear metal complex having an accumulated polynuclear metal complex consisting of a metal ion, a metal element, and a ligand.

[22] The ionic solid according to [21], wherein the cationic polynuclear metal complex is a nonanuclear to dictanuclear cationic metal complex.

[23] The ionic solid according to [21] or [22], wherein the cationic polynuclear metal complex is one or more accumulated polynuclear metal complexes consisting of an ion of metal A selected from the group consisting of group 11 in the periodic table, one or more transition metals B other than the metal A, and one or more ligands selected from the group consisting of tripod phosphine and an amino acid having a thiol group.

[24] The ionic solid according to any one of [21] to [23], wherein the cationic polynuclear metal complex comprises a polynuclear metal complex of the following formula (11):

$$[M^{11}{}_6 M^{12}{}_h (X^{11})_{ma} (X^{12})_{3ma}]_{na} \quad (11)$$

wherein each $M^{11}$ independently represents an ion of metal A selected from the group consisting of group 11 in the periodic table, each $M^{12}$ independently represents transition metal B other than the metal A, each $X^{11}$ independently represents tripod phosphine, each $X^{12}$ independently represents an amino acid having a thiol group, h represents 3 or 6, ma represents 1 or 2, and na represents an integer from 1 to 18.

[25] The ionic solid according to any one of [21] to [24], wherein the crystal lattice is formed from a material of the following formula (12):

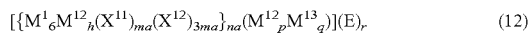

$$[\{M^1{}_6 M^{12}{}_h (X^{11})_{ma} (X^{12})_{3ma}\}_{na} (M^{12}{}_p M^{13}{}_q)](E)_r \quad (12)$$

wherein each $M^{11}$ independently represents an ion of metal A selected from the group consisting of group 11 in the periodic table, each $M^{12}$ independently represents transition metal B other than the metal A, each $M^{13}$ independently represents a metal other than the metal A, each $X^{11}$ independently represents tripod phosphine, each $X^{12}$ independently represents an amino acid having a thiol group, h represents 3 or 6, ma represents 1 or 2, na represents an integer from 1 to 18, E represents an anion or an inorganic acid, and p, q and r each independently represent 0 or an integer of 1 or more, provided that p, q and r are not 0 at the same time.

[26] The ionic solid according to any one of [21] to [25], wherein the transition metal B is one or more members selected from the group consisting of Pd, Ni, Zn, Pt, Cd, Cu and Mn.

[27] The ionic solid according to any one of [21] to [26], wherein the ionic solid comprises tripod phosphine and an amino acid having a thiol group as the ligand, and a ratio of the tripod phosphine to the amino acid having a thiol group (tripod phosphine/amino acid having a thiol group) is from 1/3 to 1/2.

[28] The ionic solid according to any one of [21] to [27], wherein the tripod phosphine is 1,1,1-tris(diphenylphosphinomethyl)ethane, and the amino acid having a thiol group is penicillamine.

[29] The ionic solid according to any one of [21] to [28], wherein the pores are used as a reaction field.

[30] The ionic solid according to any one of [21] to [29], wherein the pores are used as a reaction field for condensation reaction.

[31] The ionic solid according to any one of [21] to [30], wherein the pores are used as a reaction field for the condensation reaction of an oxo anion.

[32] A method for producing an oxide, comprising using pores of an ionic solid according to any one of [21] to [31] as a reaction field for oxidation reaction.

Advantageous Effects of the Invention

The present invention can provide a novel ionic solid. The ionic solid of the present invention exerts various characteristics by incorporating a substance in pores and as such, is useful as, for example, a material for an electrochemical device, a material providing a reaction field, a gas adsorbent material, a solvent vapor adsorbent material, a molecular recognition material, a metal ion exchanger, or an anion exchanger.

DETAILED DESCRIPTION OF THE INVENTION

Figure 1:
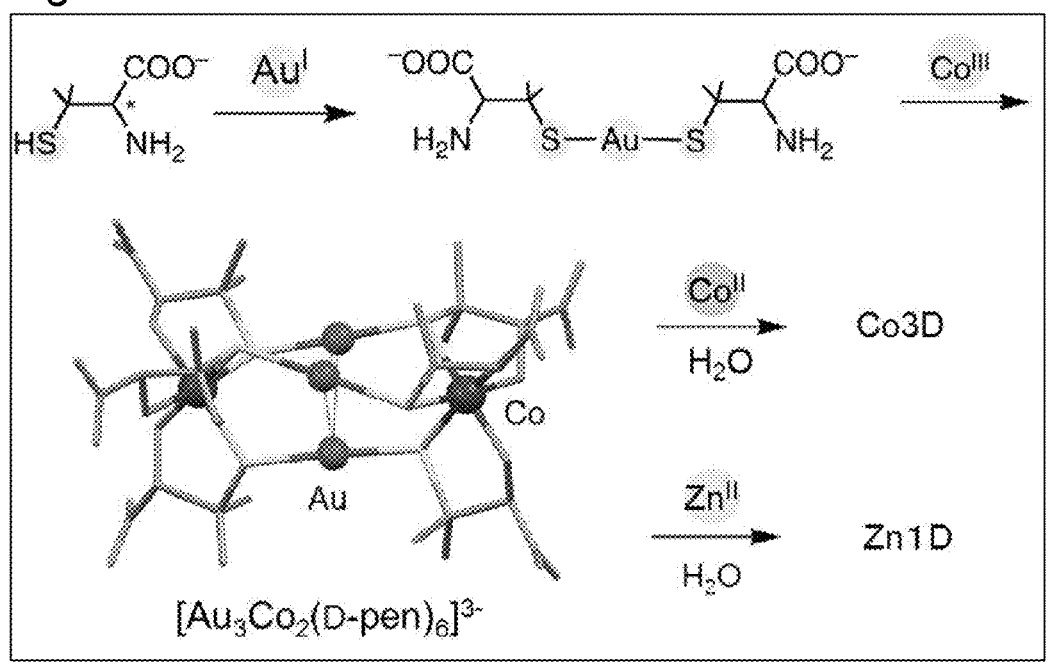
FIG. 1 is a diagram showing a synthesis scheme for ionic solids obtained in Synthesis Examples 2 and 3.

The "ionic solid" according to the present invention is not particularly limited as long as the ionic solid has pores for incorporating a substance therein. In a preferred aspect, for example, a crystal lattice defining the pores may be formed from a cationic species and an anionic species and may be formed from ionic crystals.

First Embodiment

The ionic solid according to the present embodiment has pores for incorporating a substance therein. In this context, the "ionic solid" herein refers to a non-Coulomb interaction ionic solid in which cations and anions are sparsely arranged, and not a Coulomb interaction ionic solid in which cations and anions are densely arranged, and keeps neutrality as the whole ionic solid.

In the ionic solid, a crystal lattice is of a three-dimensional skeletal structure having a linkage of cationic molecules or anionic molecules, and the crystal lattice has pores (space).

The porosity of the crystal lattice is usually 40% or more, preferably 60% or more, in the crystal lattice. In this context, the "porosity" herein is a value determined by a method described in J. Appl. Cryst., 41, 466-470, 2008. Specifically, the porosity can be calculated according to "Volume of a single crystal×Porosity per unit cell" on the basis of solvent accessible void (pore volume within a unit lattice) calculated using the VOID function of crystal structure display software (Mercury; J. Appl. Cryst. (2008). 41, 466-470).

The opening size of the pores is usually 0.5 nm or more, preferably from 0.5 to 5 nm, more preferably from 0.8 to 5 nm, further preferably from 1.5 to 4 nm. In this context, the "opening size" herein can be measured by X-ray diffraction.

The crystal lattice is not particularly limited as long as a three-dimensional skeletal structure having a linkage of cationic molecules or anionic molecules is formed. The crystal lattice is preferably formed from a metal complex. In the ionic solid, preferably, (A) an anionic metal complex and (B) a cationic species are arranged through a coordination bond or an ionic bond, or a metal complex comprising a cationic polynuclear metal complex consisting of a metal ion, a metal element, and a ligand is accumulated.

The pores of the ionic solid can incorporate one or more substances therein. For the incorporation of the substance, for example, the ionic solid can be dipped in a solution containing the substance so that the substance is incorporated in the pores through the openings of the ionic solid. In this context, the phrase "incorporate a substance" means that the substance is contained within the pores of the ionic solid, and conceptually encompasses support, inclusion, and adsorption.

Examples of the substance contained therein can include, but are not particularly limited to, gases, liquids, and solids. Among them, a liquid or a solid is preferred, and one or more members selected from the group consisting of water, an inorganic salt, a metal ion, an oxo anion and a hydrophilic substance having a molecular weight of 60 or more is more preferred, in view of easily enjoying the advantageous effects of the present invention. When the pores are filled with water, large permittivity of water can reduce Coulomb attraction. Whether or not the pores of the crystal lattice are filled with water can be determined by putting together X-ray structural analysis (the presence of an oxygen atom), CHN elemental analysis (the presence of water), IR spectra (the presence of water-derived OH stretch), and TG-DTA analysis (decrease in weight at 100° C. or lower). When an inorganic salt, a metal ion or a hydrophilic substance is contained within the pores, excellent ion conductivity can be exhibited. Further, the pores can be used as a reaction field for chemical reaction. These functions will be mentioned later.

The metal ion is preferably a monovalent or divalent metal cation. Examples thereof can include sodium ions, potassium ions, copper ions, and cadmium ions.

The inorganic salt is not particularly limited as long as the inorganic salt can be dissolved in water and an aprotic polar solvent. Examples thereof can include nitrate such as cadmium nitrate and copper nitrate.

Examples of the hydrophilic substance having a molecular weight of 60 or more can include organic compounds having a molecular weight of 60 or more and having a hydroxy group, a sulfanyl group, an amino group, a carboxyl group or an amide group. Specifically, examples thereof include one or more members selected from the group consisting of a polyhydric alcohol having a molecular weight of 60 or more, a cyclic oligosaccharide having a molecular weight of 60 or more, a saccharide having a molecular weight of 60 or more, a sugar alcohol having a molecular weight of 60 or more, and an amino acid having a molecular weight of 60 or more or a derivative thereof.

Examples of the polyhydric alcohol having a molecular weight of 60 or more can include ethylene glycol and polyethylene glycol.

Examples of the cyclic oligosaccharide having a molecular weight of 60 or more include α-cyclodextrin, β-cyclodextrin, and γ-cyclodextrin.

Examples of the saccharide having a molecular weight of 60 or more can include monosaccharides such as glucose, and disaccharides such as sucrose, lactose, maltose, and trehalose.

Examples of the sugar alcohol having a molecular weight of 60 or more include maltitol, arabitol, xylitol, sorbitol, adonitol, galactitol, and erythritol.

Examples of the amino acid having a molecular weight of 60 or more or the derivative thereof can include penicillamine and aspartic acid.

The ionic solid according to the present embodiment, which contains a substance within its pores, can be used as, for example, a material for an electrochemical device, such as ion secondary batteries, electrochromic elements, or thermoelectric elements, and a material providing a reaction field for oxidation reaction or the like as well as a gas adsorbent material, a solvent vapor adsorbent material, a molecular recognition material, a metal ion exchanger, and an anion exchanger. These purposes will be mentioned later.

Second Embodiment

The ionic solid according to the present embodiment is an ionic solid having pores for incorporating a substance therein, wherein the pores are defined by a crystal lattice of a metal complex, and the metal complex is formed by arranging (A) an anionic metal complex and (B) a cationic species through a coordination bond or an ionic bond. The ionic solid according to the present embodiment has (A) an anionic metal complex and (B) a cationic species. The anionic metal complex (A) and the cationic species (B) formally keep the neutrality of the whole ionic solid by association with a salt and can be isolated as crystals. The pores of the crystal lattice formed by the arrangement of the anionic metal complex (A) and the cationic species (B) may be filled with water.

In this context, the "anionic metal complex" herein refers to a metal complex which behaves as an anion by ionization with a counter cation when dissolved in a polar solvent such as water or an alcohol. The "cationic species" refers mainly to an inorganic ion typified by an aqua cation of a metal or the like. The porosity and opening size of the ionic solid according to the present embodiment are as described above.

The anionic metal complex (A) is a metal complex anion consisting of a metal element and a ligand and is preferably a metal complex anion consisting of two metal elements and one ligand, more preferably a polynuclear complex anion in which a metal element selected from the group consisting of groups 6, 9 and 13 in the periodic table, and a metal element selected from the group consisting of groups 10 and 11 in the periodic table are bonded via one ligand, in view of porosity and ion conductivity. The polynuclear metal anion is further preferably a $M^1M^2$ pentanuclear complex anion in which two metal elements ($M^1$) and three metal elements ($M^2$) are bonded via one ligand, wherein the two metal elements ($M^1$) are the same or different and are selected from the group consisting of group 9 elements in the periodic table, and the three metal elements ($M^2$) are the same or different and are selected from the group consisting of group 11 elements in the periodic table.

Examples of the group 6, 9 and 13 metal elements in the periodic table include Co, Rh, Ir, Cr, Mo, W, B, Al, Ga, In and Ti. Among them, a group 9 metal element in the periodic table is preferred, Co or Rh is more preferred, and Co is further preferred, in view of porosity and ion conductivity.

Examples of the group 10 and 11 metal elements in the periodic table include Au, Ag, Cu, Pt, Pd and Ni. Among them, a group 11 metal element in the periodic table is preferred, Au or Ag is more preferred, Au is further preferred, in view of porosity and ion conductivity.

A known ligand can be used as the ligand. A multidentate ligand having a plurality of coordination positions for metal ions is preferred because this ligand is capable of forming a coordination bond through a stable chelate structure with a metal ion. Particularly, the ligand preferably has a thiol group which can stably form a metal-ligand bond in water, and is more preferably an amino acid having a thiol group. The relative positions of the amino group and the carboxyl group are not particularly limited. The amino acid is not limited to an α-amino acid, and the carboxyl group may be located at so-called ω-position. The amino group and the thiol group are preferably located so as to have a chelate structure for a metal, and more preferably located at β- or γ-position of the carboxyl group. Examples of such a compound can include cysteine, penicillamine (D-pen), N-methylcysteine, N-methylpenicillamine, N,N'-ethylenebiscysteine, and N,N'-ethylenebispenicillamine (D-epen). The ionic solid can have one or more ligands.

Preferred examples of the anionic metal complex (A) used in the ionic solid of the present embodiment can include materials of the following formula (1):

wherein
each $M^1$ independently represents metal elements which are the same or different and are selected from the group consisting of group 9 elements in the periodic table,
each $M^2$ independently represents metal elements which are the same or different and are selected from the group consisting of group 11 elements in the periodic table,
$X^1$ represents an amino acid having a thiol group,
d represents a number from 0 to 4,
e represents a number from 0 to 4,
f represents a number from 1 to 8, and
k represents a number from 1 to 4,
provided that d and e are not 0 at the same time.

The metal elements $M^1$ and $M^2$ and the amino acid $X^1$ having a thiol group are as described above. When a plurality of $M^1$ are present, they may be the same or different. The same holds true for $M^2$ and $X^1$.

The cationic species (B) preferably comprises a cationic metal complex in view of porosity and ion conductivity. The cationic metal complex consists of a metal element and a ligand and is preferably a cationic metal complex in which a ligand is bonded to one metal element as the center, more preferably a cationic metal complex in which a ligand is bonded to a metal element selected from the group consisting of groups 7, 9, 10 and 12 in the periodic table as the center, further preferably a cationic metal complex in which one ligand is bonded to a metal element selected from the group consisting of groups 9 and 12 in the periodic table as the center, in view of porosity and ion conductivity.

Examples of the group 7, 9, 10 and 12 metal elements in the periodic table include Mn, Tc, W, Co, Rh, Ir, Ni, Pd, Pt and Zn. Among them, a group 9 or 12 metal element in the periodic table is preferred, and Co or Zn is more preferred, in view of porosity and ion conductivity.

The ligand is not particularly limited as long as the ligand can form a stable cationic metal complex by coordination with a metal element. A known ligand may be used, and the ionic solid can have one or more ligands. Examples thereof can include water, ammine, diamine, inorganic acid ions, carboxylate, and dicarboxylate. Examples of the diamine include ethylenediamine and 1,3-diaminopropane. Examples of the inorganic ion include halide ions, nitrite ions, nitrate ions, sulfate ions, borate ions, phosphate ions, cyanate ions, thiocyanate ions, and silicate ions. Examples of the carboxylate include formate ions, acetate ions, trifluoroacetate ions, propionate ions, and benzoate ions. Examples of the dicarboxylate include fumarate ions and benzenedicarboxylate ions. Among them, water, ammine, diamine, an inorganic ion, or carboxylate is preferred, and water, ammine, an acetate ion, ethylenediamine, or a 1,3-diaminopropane is more preferred, in view of porosity and ion conductivity.

The cationic species (B) used in the ionic solid of the present embodiment may contain an alkali metal ion or an alkaline earth metal ion as long as the cationic species (B) comprises a cationic metal complex. Examples thereof can include metal complexes of the following formula (2):

wherein
A represents an alkali metal ion or an alkaline earth metal ion,
$M^3$ represents a metal element selected from the group consisting of groups 9 and 12 in the periodic table, each $X^2$ independently represents one or more members selected from the group consisting of water, ammine, diamine, a nitrite ion and carboxylate,
a represents a number from 0 to 10,
l represents a number from 0 to 1,
m represents a number from 1 to 6, and
j represents a number from 1 to 3,
provided that a and l are not 0 at the same time.

Examples of the alkali metal ion include $Li^+$, $Na^+$, $K^+$, $Cs^+$, and $Rb^+$. Examples of the alkaline earth metal ion can include $Mg^{2+}$ and $Ca^{2+}$.

Specific examples of the group 9 and 12 metal elements $M^3$ in the periodic table are as described above. When a plurality of $M^3$ are present, they may be the same or different. The same holds true for $X^2$.

Preferred specific examples of the cationic metal complex include compounds of the following compound group α. The ionic solid can have one or more cationic metal complexes.

<Compound Group α>
$[Co(NH_3)_6]^{3+}$, $[Co(H_2O)(NH_3)_5]^{3+}$, $[Co(NO_2)(NH_3)_5]^{2+}$, $[Co(H_2O)_6]^{2+}$, $[Ni(H_2O)_6]^{2+}$, $[Mn(H_2O)_6]^{2+}$, $[Co(H_2O)_4]^{2+}$, $[Ni(H_2O)_4]^{2+}$, $[Mn(H_2O)_4]^{2+}$, $\{Li[Zn(OAc)_2]\}^+$, $\{Na[Zn(OAc)_2]\}^+$, $\{K[Zn(OAc)_2]\}^+$, $\{Cs[Zn(OAc)_2]\}^+$, $\{Na_2Cs_7[Zn(OAc)_2]\}^{9+}$, $\{Na_9[Zn(OAc)_2]\}^{9+}$, $[Co(en)_3]^{3+}$, $[Co(tn)]_{3+}$
provided that OAc represents an acetate ion, en represents ethylenediamine, and tn represents 1,3-diaminopropane.

The crystal lattice of the ionic solid of the present embodiment preferably comprises a metal complex of the following formula (3), (4) or (5). One or more such metal complexes can be contained.

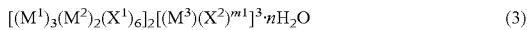

$$[(M^1)_3(M^2)_2(X^1)_6]_2[(M^3)(X^2)_{m1}]^3 \cdot nH_2O \quad (3)$$

wherein
each $M^1$ independently represents metal elements which are the same or different and are selected from the group consisting of group 9 elements in the periodic table,
each $M^2$ independently represents metal elements which are the same or different and are selected from the group consisting of group 11 elements in the periodic table,
$M^3$ represents a metal element selected from the group consisting of groups 9 and 12 in the periodic table,
each $X^1$ independently represents an amino acid having a thiol group,
each $X^2$ independently represents one or more members selected from the group consisting of water, ammine, diamine and carboxylate,
m1 represents a number from 1 to 6, and
n represents a number from 1 to 100.

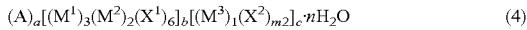

$$(A)_a[(M^1)_3(M^2)_2(X^1)_6]_b[(M^3)_1(X^2)_{m2}]_c \cdot nH_2O \quad (4)$$

wherein
each $M^1$ independently represents metal elements which are the same or different and are selected from the group consisting of group 9 elements in the periodic table,
each $M^2$ independently represents metal elements which are the same or different and are selected from the group consisting of group 11 elements in the periodic table,
$M^3$ represents a metal element selected from the group consisting of groups 9 and 12 in the periodic table,
each $X^1$ independently represents an amino acid having a thiol group,
each $X^2$ independently represents one or more members selected from the group consisting of water, ammine, diamine, a nitrite ion and carboxylate,
each A independently represents an alkali metal ion or an alkaline earth metal ion,
a represents a number from 0 to 10,
b represents a number from 1 to 3,
c represents a number from 1 to 3,
l represents a number from 0 to 1,
m2 represents a number from 1 to 6, and
n represents a number from 1 to 100,
provided that a and l are not 0 at the same time.

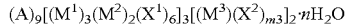

$$(A)_9[(M^1)_3(M^2)_2(X^1)_6]_3[(M^3)(X^2)_{m3}]_2 \cdot nH_2O \quad (5)$$

wherein
each $M^1$ independently represents metal elements which are the same or different and are selected from the group consisting of group 9 elements in the periodic table,
each $M^2$ independently represents metal elements which are the same or different and are selected from the group consisting of group 11 elements in the periodic table,
$M^3$ represents a metal element selected from the group consisting of groups 9 and 12 in the periodic table,
each $X^1$ independently represents an amino acid having a thiol group,
each $X^2$ independently represents one or more members selected from the group consisting of water, ammine, diamine, a nitrite ion and carboxylate,
each A independently represents an alkali metal ion or an alkaline earth metal ion,
m3 represents a number from 1 to 6, and
n represents a number from 1 to 100.

In the formulas (3) to (5), m1, m2 and m3 are preferably a number from 2 to 6, and n is preferably a number from 2 to 50. The metal elements $M^1$, $M^2$ and $M^3$, the amino acid $X^1$ having a thiol group, and the alkali metal ion and alkaline earth metal ion A are as described above. When a plurality of $M^1$ are present, they may be the same or different. The same holds true for $M^2$, $M^3$, $X^1$ and A.

Figure 2:
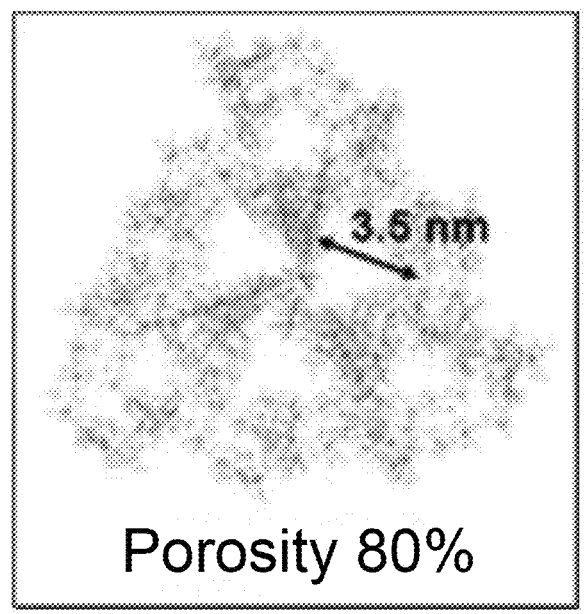
FIG. 2 is a diagram showing the crystal structure of an ionic solid obtained in Synthesis Example 2.
Figure 3:
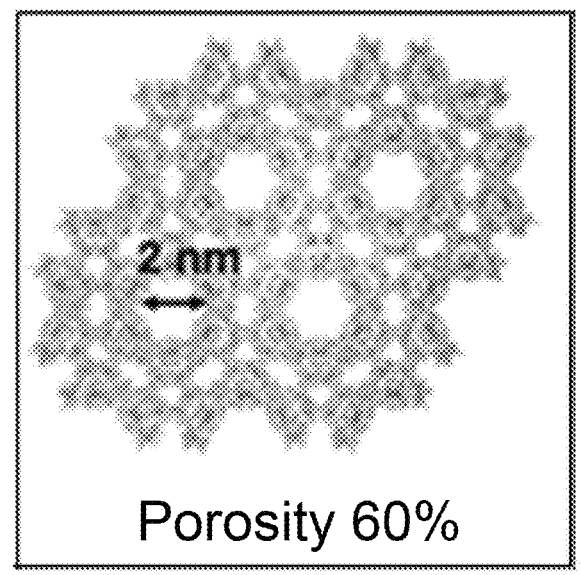
FIG. 3 is a diagram showing the crystal structure of an ionic solid obtained in Synthesis Example 3.

One example of an ionic solid formed as a crystal lattice comprising the metal complex of the formula (4) or (5) is shown in FIGS. 2 and 3. As shown in FIGS. 2 and 3, the opening size of the pores of the crystal lattice is 0.5 nm or more, and the porosity of the crystal lattice is 40% or more.

Various substances such as water can be incorporated in the pores of the crystal lattice formed by the arrangement of the anionic metal complex (A) and the cationic species (B). Particularly, as for a hydrophilic substance, it has been found that the one having a small molecular weight cannot be included therein, whereas, unexpectedly, the one having a molecular weight of 60 or more can be specifically included therein. As more detailed studies have been pursued, it has been found that the ionic solid including such a hydrophilic substance exhibits excellent ion conductivity.

The molecular weight of the hydrophilic substance is preferably 70 or more, more preferably 80 or more, in view of relationship with the pores. As for the upper limit value, the molecular weight of the hydrophilic substance is preferably 1600, more preferably 1500, in view of easy inclusion.

Examples of the hydrophilic substance having a molecular weight of 60 or more include organic compounds having a molecular weight of 60 or more and having a hydroxy group, a sulfanyl group, an amino group, a carboxyl group or an amide group. Specific examples thereof can include the same as mentioned above. Among them, a polyhydric alcohol having a molecular weight of 60 or more, a cyclic oligosaccharide having a molecular weight of 60 or more, a saccharide having a molecular weight of 60 or more, a sugar alcohol having a molecular weight of 60 or more, or an amino acid having a molecular weight of 60 or more is preferred in view of ion conductivity. One or more hydrophilic substances can be used.

For the incorporation of the hydrophilic substance, for example, the ionic solid can be dipped in the hydrophilic substance, water containing the hydrophilic substance, or an aqueous organic solvent solution containing the hydrophilic substance so that the hydrophilic substance is incorporated in the pores through the openings of the ionic solid. The organic solvent is not particularly limited as long as the organic solvent is soluble in water. For example, an alcohol such as ethanol can be used.

A compound different from the hydrophilic substance may be included in the pores and/or the hydrophilic substance of the crystal lattice of the ionic solid in which the hydrophilic substance is incorporated.

The ionic solid according to the present embodiment may be produced by an appropriate method and can be produced, for example, by reacting a salt of an anionic metal complex with a cationic metal complex. The salt of the anionic metal complex and the cationic metal complex can be produced by known methods. The reaction between these metal complexes can be performed, for example, by stirring the salt of the anionic metal complex and the cationic metal complex in a solvent such as water or an acetic acid/potassium acetate buffer solution. For isolation operation, for example, the solid can be washed with an alcohol such as ethanol and then separated by filtration or the like.

The ionic solid according to the present embodiment can be applied to various purposes described in the first embodiment by incorporating various substances in its pores, and can exhibits, for example, high ion conductivity and bulk ion conductivity by including a hydrophilic substance in the pores of the crystal lattice. While xylitol, arabitol and adonitol are saccharides having the same molecular weight, xylitol is more easily included therein than arabitol or adonitol as shown in Examples described later. Therefore, the ionic solid may be used as a molecular recognition material. The ionic solid of the formula (2), which contains the metal ion in the pores of the crystal lattice, enables a metal ion to migrate in the ionic solid, and as such, is capable of further potentiating ion conductivity, and this ionic solid is thus useful as a material for an electrochemical device, such as ion secondary batteries, electrochromic elements, or thermoelectric elements.

Third Embodiment

The ionic solid according to the present embodiment is an ionic solid having pores for incorporating a substance therein, wherein the pores are defined by a crystal lattice of a cationic polynuclear metal complex, i.e., a metal complex, and the crystal lattice of a cationic polynuclear metal complex has one or more accumulated polynuclear metal complexes consisting of a metal ion, a metal element, and a ligand. Further, the ionic solid according to the present embodiment keeps neutrality as the whole ionic solid by the ionic bond between the cationic polynuclear metal complex and an anion. In this context, the "cationic metal complex" herein refers to a metal complex which behaves as a cation by ionization with a counter anion when dissolved in a polar solvent such as water or an alcohol. The porosity and opening size of the ionic solid according to the present embodiment are as described above.

The cationic polynuclear metal complex is an accumulated polynuclear metal complex and is preferably nonanuclear to dictanuclear, more preferably tridecanuclear to 160-nuclear.

Examples of the metal ion constituting the cationic polynuclear metal complex include ions of metals selected from the group consisting of group 9 in the periodic table, ions of metals selected from the group consisting of group 11 in the periodic table, and ions of metals selected from the group consisting of group 12 in the periodic table. Among them, an ion of metal A selected from the group consisting of group 11 in the periodic table is preferred, and one or more members selected from the group consisting of Cu, Ag and Au are preferred.

The metal element constituting the cationic polynuclear metal complex is not particularly limited as long as the metal element is one or more transition metals B other than the metal A. The transition metal B may be a metal selected from the group consisting of group 11 in the periodic table as long as the metal is not the metal A constituting the polynuclear metal complex. The transition metal B is preferably one or more members selected from the group consisting of Pd, Ni, Zn, Pt, Cd, Cu and Mn.

The ligand constituting the cationic polynuclear metal complex is not particularly limited as long as the ligand can form a metal complex by a coordination bond with a metal atom. Examples thereof include one or more members selected from the group consisting of tripod phosphine and an amino acid having a thiol group. A combination of tripod phosphine and an amino acid having a thiol group is preferred.

In the case of comprising tripod phosphine and an amino acid having a thiol group as the ligand, the ratio of the tripod phosphine to the amino acid having a thiol group (tripod phosphine/amino acid having a thiol group) is preferably from 1/3 to 1/2.

Examples of the tripod phosphine can include tris(diphenylphosphinoalkyl)alkane. Examples of the tris(diphenylphosphinoalkyl)alkane include 1,1,1-tris(diphenylphosphinomethyl)ethane.

Examples of the amino acid having a thiol group include the same as mentioned above. Among them, penicillamine is preferred.

The combination of the tripod phosphine and the amino acid having a thiol group is preferably a combination of 1,1,1-tris(diphenylphosphinomethyl)ethane and penicillamine.

The cationic polynuclear metal complex is preferably one or more accumulated polynuclear metal complexes consisting of an ion of metal A selected from the group consisting of group 11 in the periodic table, one or more transition metals B other than the metal A, and one or more ligands selected from the group consisting of tripod phosphine and an amino acid having a thiol group, more preferably one or more accumulated polynuclear metal complexes consisting of an ion of metal A selected from the group consisting of group 11 in the periodic table, one or more transition metals B other than the metal A, and a ligand comprising tripod phosphine and an amino acid having a thiol group. In such a polynuclear metal complex, for example, the sulfur atom of the amino acid having a thiol group is linked to the metal A (e.g., Au), and this metal A is further cross-linked to the tripod phosphine to form a trinuclear metal complex. Two such trinuclear metal complexes are further cross-linked to three transition metal B ions (e.g., Cu ions) using the amino acids having a thiol group to form a nonanuclear metal complex. When the nonanuclear metal complex is defined as one unit, for example, 12 nonanuclear metal complexes are linked through eight metal B ions (e.g., Cu) to form a cationic 116-nuclear metal complex. This cationic 116-nuclear metal complex has an accumulated structure of a structure as one unit where the 8 transition metal B ions (e.g., Cu ions) of the nonanuclear metal complex are located at the vertices of a simple cubic lattice.

At the same time with the cationic 116-nuclear metal complex formation, the trinuclear metal complexes may be cross-linked to three transition metal B ions (e.g., Cu ions) using the amino acids having a thiol group, and additional three transition metal B ions (e.g., Cu ions) may be coordinated to the cross-linking sites to form a dodecanuclear metal complex. When the dodecanuclear metal complex is defined as one unit, for example, 12 such dodecanuclear metal complexes may be linked through eight metal B ions (e.g., Cu) to form a cationic 152-nuclear metal complex. Thus, the above-described cationic 116-nuclear metal complex may be mixed with the cationic 152-nuclear metal complex.

The cationic polynuclear metal complex which confers such a structure comprises a polynuclear metal complex of the following formula (11) and can form an ionic solid of the following formula (12):

$$[M^{11}{}_6 M^{12}{}_h (X^{11})_{ma} (X^{12})_{3ma}]_{na} \quad (11)$$

wherein
each $M^{11}$ independently represents an ion of metal A selected from the group consisting of group 11 in the periodic table,
each $M^{12}$ independently represents transition metal B other than the metal A,
each $X^{11}$ independently represents tripod phosphine,
each $X^{12}$ independently represents an amino acid having a thiol group,
h represents 3 or 6,
ma represents 1 or 2, and
na represents an integer from 1 to 12.

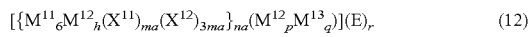

$$[\{M^{11}{}_6 M^{12}{}_h (X^{11})_{ma} (X^{12})_{3ma}\}_{na} (M^{12}{}_p M^{13}{}_q)](E)_r \quad (12)$$

wherein
each $M^{11}$ independently represents an ion of metal A selected from the group consisting of group 11 in the periodic table,
each $M^{12}$ independently represents transition metal B other than the metal A,
each $M^{13}$ independently represents a metal other than the metal A,
each $X^{11}$ independently represents tripod phosphine,
each $X^{12}$ independently represents an amino acid having a thiol group,
h represents 3 or 6,
ma represents 1 or 2,
na represents an integer from 1 to 18,
E represents an anion or an inorganic acid, and
p, q and r each independently represent 0 or an integer of 1 or more, provided that p, q and r are not 0 at the same time.

Specific examples of the ion $M^{11}$ of metal A selected from the group consisting of group 11 in the periodic table, the transition metal B other than the metal A ($M^{12}$), the tripod phosphine $X^{11}$, and the amino acid $X^{12}$ having a thiol group include the same as mentioned above. When a plurality of such moieties are present, they may be the same or different.

Examples of the metal $M^{13}$ other than the metal A include Na and Cd. When a plurality of $M^{13}$ are present, they may be the same or different.

ma is 1 or 2 and can be appropriately selected.

na is an integer from 1 to 18, preferably 1 to 15, more preferably 1 to 12.

Examples of the anion E can include, but are not particularly limited to, $Cl^-$, $Br^-$, $F^-$, $O^{2-}$, $S^{2-}$, $Te^{2-}$, $N_3^-$, $NO_3^-$, $ClO_4^-$, $BF_4^-$, $SiF_6^{2-}$, $SO_4^{2-}$, and $PF_4^-$. Examples of the inorganic acid can include nitric acid, sulfuric acid, hydrochloric acid, chloric acid, and phosphoric acid.

p, q and r each independently represent 0 or an integer of 1 or more. p is preferably 1 to 30, more preferably 1 to 20. q is preferably 1 to 30, more preferably 1 to 20. r is preferably 1 to 30, more preferably 1 to 20. However, p, q and r are not 0 at the same time.

The ionic solid according to the present embodiment may be produced by an appropriate method and can be produced, for example, by reacting a ligand with a salt of metal A in a solvent to obtain a polynuclear metal complex, subsequently reacting the polynuclear metal complex with a salt of transition metal B in a solvent to obtain an ionic solid having a crystal lattice of a cationic polynuclear metal complex, and then accumulating such polynuclear metal complexes to produce an ionic solid having accumulated cationic polynuclear metal complexes. The organic solvent is not particularly limited as long as the organic solvent is soluble in water. For example, an alcohol such as methanol or ethanol can be used.

The obtained ionic solid can be dipped in an aqueous solution of a salt of a metal other than the metal A to produce a new ionic solid having another metal ion replaced for the metal A ion.

The ionic solid according to the present embodiment may be applied to various purposes described in the first embodiment by incorporating various substances in its pores, and is particularly preferably used as a material providing a reaction field. In this context, the "reaction field" herein refers to a site where chemical reaction is carried out within the pores which are nanospace. The reaction to be carried out within the pores of the ionic solid is not particularly limited and can be appropriately selected according to the incorporated substance or a substance produced through the chemical reaction within the pores. Examples thereof include condensation, polymerization reaction, hydrolysis reaction, oxidation reaction, reduction reaction, elimination reaction, and rearrangement reaction. More specifically, for example, the ionic solid is dipped in a solution containing a molybdate ion, which is an oxo anion, so that the molybdate ion is incorporated in the pores in the ionic solid. The pores can be used as a reaction field for condensation reaction, and the molybdate ions can be condensed to produce an ionic solid including a polyacid. The oxo anion used here is not particularly limited as long as the oxo anion is a metal oxo anion. Examples thereof include tungstate, molybdate, vanadate, manganate, perrhenate, and chromate. The polyacid can be produced from one metal oxo anion or a plurality of metal oxo anions.

The polyacid-inclusion ionic solid may be used in oxidation reaction. Specifically, the polyacid-inclusion ionic solid and an oxidizing agent are allowed to act on a solution containing a substance to be oxidized so that the oxidizing agent within the pores can oxidize the substance to be oxidized with the polyacid as a catalyst to produce an oxide of the substance to be oxidized. Thus, an oxide can be produced by using the pores of the ionic solid according to the present embodiment as a reaction field for oxidation reaction. The oxidation reaction can be performed at normal temperature (20±15° C.) and normal pressure (atmospheric pressure) and does not require heating or cooling and increase or reduction in pressure. Therefore, the oxidation reaction can be efficiently performed with energy saved. The types of the oxidizing agent and the substance to be oxidized are not particularly limited and may be appropriately selected. The amounts of the oxidizing agent and the substance to be oxidized used can be appropriately set according to their types.

Thus, the substance produced through chemical reaction within the pores of the ionic solid is not only effective as a reaction field through the substance incorporated in the pores, but can be used for the purposes described above.

EXAMPLES

Hereinafter, the embodiments of the present invention will be described further specifically with reference to Examples. However, the present invention is not limited by Examples given below.
(1) X-Ray Structural Analysis
  Apparatus: Mercury 2 (manufactured by Rigaku Corp.)
  X-ray source: Radiation light (SPring-8) 0.7000 angstroms
  Measurement range: 2θ=1 to 59°
  Measurement interval: 1°
  Scanning rate: 20°/min
  Light quantity: 1010 photons/sec
(2) Nuclear Magnetic Resonance
  $^1$H NMR was measured at room temperature using ECS500 (500 MHz) manufactured by JEOL Ltd.
(3) Raman Spectroscopy
  Raman spectroscopy was performed at room temperature using NR-1800 (excitation light: 523 nm, semiconductor laser) manufactured by JASCO Corp. The presence of iodine was determined from the presence or absence of a peak from 100 to 300 cm-1, and the maximum wavelength.

Synthesis Example 1

Synthesis of $Na_3[Co_2Au_3(D\text{-}pen)_6]_2 \cdot 13H_2O$ 2.5 g of D-pen (D-penicillamine) was suspended in 40 ml of methanol. To this suspension, 3.4 g of an aqueous tetrachloroauric(III) acid solution and 2 mL of 2,2'-thiodiethanol were added, and the mixture was stirred. Further, 3.8 mL of 28% aqueous ammonia was added thereto, and the mixture was left standing overnight at room temperature and then filtered to obtain crystals. To 100 mL of an aqueous solution containing 1 g of the crystals, 6 mL of a 1 M aqueous sodium acetate solution and 430 mg of sodium tricarbonatocobaltate(III) were added, and the mixture was stirred at room temperature for 1 hour. Then, to the resulting purple solution, 30 mL of methanol was added, and the mixture was left standing overnight, filtered, and dried to obtain crystals of $Na_3[CO_2Au_3(D\text{-}pen)] \cdot 13H_2O$. The isolation yield was 788 mg (71%).

Synthesis Example 2

Synthesis of $[Co(H_2O)_6]_3[Co_2Au_3(D\text{-}pen)_6]_2 \cdot nH_2O$ (Hereinafter, Also Referred to as "Co3D")

To a purple solution containing $Na_3[Co_2Au_3(D\text{-}pen)_6] \cdot 13H_2O$ (100 mg, 0.0602 mmol) in $H_2O$ (3 mL), a 1 M aqueous $NH_4Cl$ solution (400 μL) was added. The solution was stirred at room temperature for 10 minutes, followed by the addition of a pink solution containing $Co(OAc)_2 \cdot 4H_2O$ (26 mg, 0.10 mmol) in water (1.6 mL). The mixture was stirred at room temperature for several minutes and then left at room temperature for 12 hours. The obtained purple plate-like crystals were collected by filtration. The obtained crystals were confirmed by X-ray analysis to be an ionic solid of the chemical formula. FIG. 1 shows the synthesis scheme of Co3D. FIG. 2 shows the crystal structure of the ionic solid. The isolation yield was 48 mg (39%). The pores of Co3D had an opening size of 3.5 nm and porosity of 80%.

Synthesis Example 3

Synthesis of $Na_9[\{Zn(OAc)_2\}\{Co_2Au_3(D\text{-}pen)_6\}_3] \cdot nH_2O$ (Hereinafter, Also Referred to as "Zn1D")

$Na_3[Co_2Au_3(D\text{-}pen)_6] \cdot 13H_2O$ (50 mg, 0.030 mmol) of Synthesis Example 1 was dissolved in a sodium acetate buffer solution (2.5 mL, pH 5.5, $[OAc^-]$=0.9 M) to prepare a purple solution, to which a colorless solution of a NaOAc buffered aqueous solution (2.5 mL, pH 5.5, $[OAc^-]$=0.9 M) of $Zn(OAc)_2 \cdot 2H_2O$ (10 mg, 0.045 mmol) was then added. The mixture was stirred at room temperature for 5 minutes to obtain a dark purple solution. The reaction solution was left at room temperature for 2 weeks. Then, purple hexagonal prism-like crystals were collected by filtration. The obtained crystals were confirmed by X-ray analysis, as in Synthesis Example 1, to be an ionic solid of the chemical formula. FIG. 1 shows the synthesis scheme of Zn1D. FIG. 3 shows the crystal structure of the ionic solid. The isolation yield was 14 mg (23%). The pores of Zn1D had an opening size of 2 nm and porosity of 60%.

Synthesis Example 4

Synthesis of $[Co(en)_3][Co_2Au_3(D\text{-}pen)_6] \cdot nH_2O$

To a purple solution of $Na_3[Co_2Au_3(D\text{-}pen)_6] \cdot 13H_2O$ (30 mg, 0.018 mmol) dissolved in $H_2O$ (10 mL), a yellow solution of rac-$[Co(en)_3](NO_3)_3$ (7.1 mg, 0.017 mmol) dissolved in water (10 mL) was added. The solution was stirred at room temperature for 10 minutes. Then, the mixture was left at room temperature for 2 months. The obtained purple hexagonal prism-like crystals were collected by filtration. The obtained crystals were confirmed by X-ray analysis to be an ionic solid of the chemical formula. The isolation yield was 16 mg (43%). The pores of the ionic solid had an opening size of 2 nm and porosity of 60%.

Synthesis Example 5

Synthesis of $[Co(tn)_3][Co_2Au_3(D\text{-}pen)_6] \cdot nH_2O$

To a purple solution of $Na_3[Co_2Au_3(D\text{-}pen)_6] \cdot 13H_2O$ (100 mg, 0.0602 mmol) dissolved in $H_2O$ (10 mL), a yellow solution of rac-$[Co(tn)_3]Cl_3$ (25 mg, 0.064 mmol) dissolved in water (10 mL) was added. The solution was stirred at room temperature for 5 minutes. Then, the mixture was left at room temperature for 10 days. The obtained purple hexagonal prism-like crystals were collected by filtration. The obtained crystals were confirmed by X-ray analysis to be an ionic solid of the chemical formula. The isolation yield was 25 mg (22%). The pores of the ionic solid had an opening size of 2 nm and porosity of 60%.

Synthesis Example 6

Synthesis of $[Na_{10}(OAc)(H_2O)_{30}][Co_2Au_3(D\text{-}pen)]_3 \cdot nH_2O$

To $Na_3[Co_2Au_3(D\text{-}pen)_6] \cdot 13H_2O$ (100 mg, 0.0602 mmol), a sodium acetate buffer solution (0.5 M, pH 6.0) was added. The resulting purple solution was stirred. Then, the mixture was left at room temperature for 12 hours. The obtained crystals were collected by filtration. The isolation yield was 40 mg. The pores of the ionic solid had an opening size of 2.7 nm and porosity of 79%.

Synthesis of Hydrophilic Substance-Inclusion Co3D

Example 1

10 mg of the crystals of Co3D obtained in Synthesis Example 2 was dipped in 0.15 mol of ethylene glycol as a hydrophilic substance (guest compound) and left at room temperature for 2 days. Then, the crystals were washed with a large amount of ethanol to obtain an ionic solid including the guest compound as purple crystals. The amount of the hydrophilic substance (guest compound) included in the obtained ionic solid as shown in Table 1 was quantitatively analyzed by $^1$H NMR ($D_2O$). For the quantitative analysis, the number of molecules of the hydrophilic substance (guest compound) per penicillamine complex was determined by the comparison between an integrated value of methyl group protons of penicillamine and an integrated value of protons of the hydrophilic substance (guest compound) in a $^1$H NMR chart, and converted to the amount of the hydrophilic substance (guest compound) included (mass %) according to the following equation (i) The results are also shown in Table 1.

$$\text{Amount included (mass \%)} = 100 \times P \times Q/1842.5 + (P \times Q) \quad \text{(i)}$$

wherein P represents the molecular weight of the hydrophilic substance (guest compound), and Q represents the number of molecules of the hydrophilic substance (guest compound).

Example 2

An ionic solid including a guest compound was obtained by the same operation as in Example 1 except that water containing 0.9 M sucrose dissolved therein was used instead of ethylene glycol in Example 1. Then, the amount of the guest compound included was determined. The results are shown in Table 1.

Example 3

An ionic solid including a guest compound was obtained by the same operation as in Example 2 except that 0.3 M mannitol was used instead of 0.9 M sucrose in Example 2. Then, the amount of the guest compound included was determined. The results are shown in Table 1.

Example 4

An ionic solid including a guest compound was obtained by the same operation as in Example 1 except that a water-ethanol solution (water/ethanol=1/4) containing 1 M arabitol dissolved therein was used instead of ethylene glycol in Example 1. Then, the amount of the guest compound included was determined. The results are shown in Table 1.

Example 5

An ionic solid including a guest compound was obtained by the same operation as in Example 4 except that xylitol was used instead of arabitol in Example 4. Then, the amount of the guest compound included was determined. The results are shown in Table 1.

Example 6

An ionic solid including a guest compound was obtained by the same operation as in Example 4 except that adonitol was used instead of arabitol in Example 4. Then, the amount of the guest compound included was determined. The results are shown in Table 1.

Example 7

An ionic solid including a guest compound was obtained by the same operation as in Example 1 except that a water-ethanol solution (water/ethanol=1/3) containing 0.1 M D-penicillamine dissolved therein was used instead of ethylene glycol in Example 1. Then, the amount of the guest compound included was determined. The results are shown in Table 1.

Example 8

An ionic solid including a guest compound was obtained by the same operation as in Example 7 except that L-penicillamine was used instead of D-penicillamine in Example 7. Then, the amount of the guest compound included was determined. The results are shown in Table 1.

Example 9

An ionic solid including a guest compound was obtained by the same operation as in Example 1 except that a water-ethanol solution (water/ethanol=1/1) containing 0.05 M D-aspartic acid dissolved therein was used instead of ethylene glycol in Example 1. Then, the amount of the guest compound included was determined. The results are shown in Table 1.

Example 10

An ionic solid including a guest compound was obtained by the same operation as in Example 9 except that 0.15 M α-cyclodextrin was used instead of 0.05 M D-aspartic acid in Example 9. Then, the amount of the guest compound included was determined. The results are shown in Table 1. For the amount of cyclodextrin included (%), the amount of cyclodextrin included was converted to an amount per penicillamine complex by the comparison between an integrated value of methyl groups of penicillamine and an integrated value of methine groups of cyclodextrin in a $^1$H NMR chart.

Example 11

An ionic solid including a guest compound was obtained by the same operation as in Example 10 except that β-cyclodextrin was used instead of α-cyclodextrin in Example 10. Then, the amount of the guest compound included was determined. The results are shown in Table 1.

Example 12

An ionic solid including a guest compound was obtained by the same operation as in Example 10 except that γ-cyclodextrin was used instead of α-cyclodextrin in Example 10. Then, the amount of the guest compound included was determined. The results are shown in Table 1.

In Example 12, it was confirmed that two molecules of γ-cyclodextrin were included using the ionic solid of Synthesis Example 6 instead of Co3D.

Reference Example 1

The same operation as in Example 1 was performed except that water containing 10 M formaldehyde dissolved therein was used instead of ethylene glycol in Example 1.

However, after being left for 2 days, no signal from the guest compound was confirmed in $^1$H NMR. Thus, it was confirmed that the guest compound was not included. The results are shown in Table 1.

Reference Example 2

The same operation as in Reference Example 1 was performed except that a water-ethanol solution (water/ethanol=1/4) containing 14 M ethanol dissolved therein was used instead of formaldehyde in Reference Example 1. However, after being left for 2 days, no signal from the guest compound was confirmed in $^1$H NMR. Thus, it was confirmed that the guest compound was not included. The results are shown in Table 1.

wherein P represents the molecular weight of the hydrophilic substance (guest compound), and Q represents the number of molecules of the hydrophilic substance (guest compound).

Example 14

An ionic solid including a guest compound was obtained by the same operation as in Example 13 except that a water-ethanol solution (water/ethanol=1/4) containing 1 M xylitol dissolved therein was used instead of ethylene glycol in Example 13. Then, the amount of the guest compound included was determined. The results are shown in Table 2.

Example 15

An ionic solid including a guest compound was obtained by the same operation as in Example 14 except that adonitol was used instead of xylitol in Example 14. Then, the amount of the guest compound included was determined. The results are shown in Table 2.

Example 16

An ionic solid including a guest compound was obtained by the same operation as in Example 13 except that a

TABLE 1

| | Host compound | Hydrophilic substance (guest compound) | | | Solvent | Amount of hydrophilic substance (guest compound) included (mass %) |
| | | Type | Molecular weight | Concentration M | (Water/EtOH) | |
| --- | --- | --- | --- | --- | --- | --- |
| Example 1 | Co3D | Ethylene glycol | 62.07 | — | — | 6.3 |
| Example 2 | Co3D | Sucrose | 342.3 | 0.9 | Water | 35.0 |
| Example 3 | Co3D | Mannitol | 182.17 | 0.3 | Water | 33.0 |
| Example 4 | Co3D | Arabitol | 152.15 | 1 | 1/4 | 33.0 |
| Example 5 | Co3D | Xylitol | 152.15 | 1 | 1/4 | 54.0 |
| Example 6 | Co3D | Adonitol | 152.15 | 1 | 1/4 | 25.0 |
| Example 7 | Co3D | D-Penicillamine | 149.21 | 0.1 | 1/3 | 7.5 |
| Example 8 | Co3D | L-Penicillamine | 149.21 | 0.1 | 1/3 | 7.5 |
| Example 9 | Co3D | D-aspartic acid | 133.11 | 0.05 | 1/1 | 7.2 |
| Example 10 | Co3D | α-Cyclodextrin | 972.84 | 0.15 | 1/1 | 51.0 |
| Example 11 | Co3D | β-Cyclodextrin | 1134.98 | 0.15 | 1/1 | 11.0 |
| Example 12 | Co3D | γ-Cyclodextrin | 1297.12 | 0.15 | 1/1 | 68.0 |
| Reference Example 1 | Co3D | Formaldehyde | 30.03 | 10 | Water | 0 |
| Reference Example 2 | Co3D | Ethanol | 46.07 | 14 | 1/4 | 0 |

Synthesis of Hydrophilic Substance-Inclusion Zn1D

Example 13

An ionic solid including a guest compound was obtained as a purple solid by the same operation as in Example 1 except that 10 mg of the crystals of Zn1D obtained in Synthesis Example 3 was used instead of Co3D of Synthesis Example 1 as a host compound in Example 1. The amount of the hydrophilic substance (guest compound) included as shown in Table 2 in the obtained ionic solid was quantitatively analyzed by $^1$H NMR (D$_2$O). For the quantitative analysis, the number of molecules of the hydrophilic substance (guest molecules) per penicillamine complex was determined from a $^1$H NMR chart, and converted to the amount of the hydrophilic substance (guest compound) included (mass %) according to the following equation (ii) The results are also shown in Table 2.

Amount included (mass %)=100×P×Q/1721.5+(P×Q)  (ii)

water-ethanol solution (water/ethanol=1/1) containing 0.15 M α-cyclodextrin dissolved therein was used instead of ethylene glycol in Example 13. Then, the amount of the guest compound included was determined. The results are shown in Table 2. For the amount of cyclodextrin included (%), the amount of cyclodextrin included was converted to an amount per penicillamine complex by the comparison between an integrated value of methyl groups of penicillamine and an integrated value of methine groups of cyclodextrin in a $^1$H NMR chart.

Example 17

An ionic solid including a guest compound was obtained by the same operation as in Example 16 except that β-cyclodextrin was used instead of α-cyclodextrin in Example 16. Then, the amount of the guest compound included was determined. The results are shown in Table 2.

Example 18

An ionic solid including a guest compound was obtained by the same operation as in Example 16 except that γ-cyclodextrin was used instead of α-cyclodextrin in Example 16. Then, the amount of the guest compound included was determined. The results are shown in Table 2.

Reference Example 3

The same operation as in Example 13 was performed except that a water-ethanol solution (water/ethanol=1/4) containing 10 M formaldehyde dissolved therein was used instead of ethylene glycol in Example 13. However, after being left for 2 days, no signal from the guest compound was confirmed in $^1$H NMR. Thus, it was confirmed that the guest compound was not included. The results are shown in Table 2.

Reference Example 4

The same operation as in Comparative Example 3 was performed except that a water-ethanol solution (water/ethanol=1/4) containing 14 M ethanol dissolved therein was used instead of formaldehyde in Reference Example 3. However, after being left for 2 days, no signal from the guest compound was confirmed in $^1$H NMR. Thus, it was confirmed that the guest compound was not included. The results are shown in Table 2.

characteristic X-ray fluorescence of iodine and comparing its intensity with the X-ray fluorescence intensity of cobalt.

Example 20

Synthesis of α-Cyclodextrin-Inclusion Zn1D Further Including Iodine (Zn1D+α-CD+I$_2$)

Figure 4:
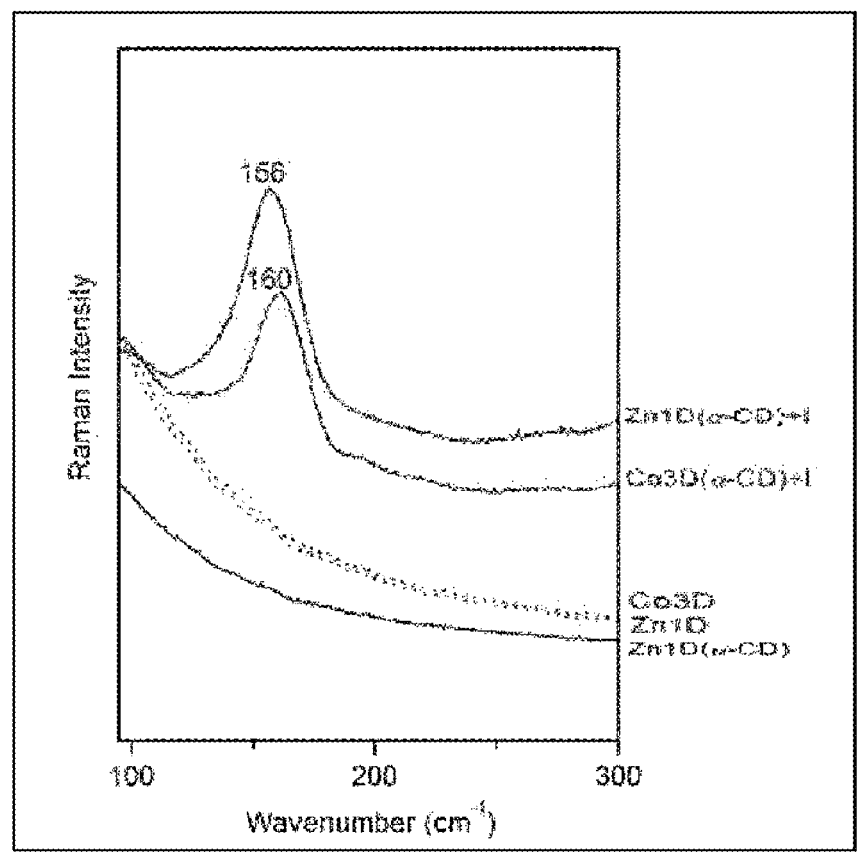
FIG. 4 is a diagram showing the Raman spectra of ionic solids obtained in Synthesis Examples 2 and 3 and Examples 16, 19 and 20.
Figure 5:
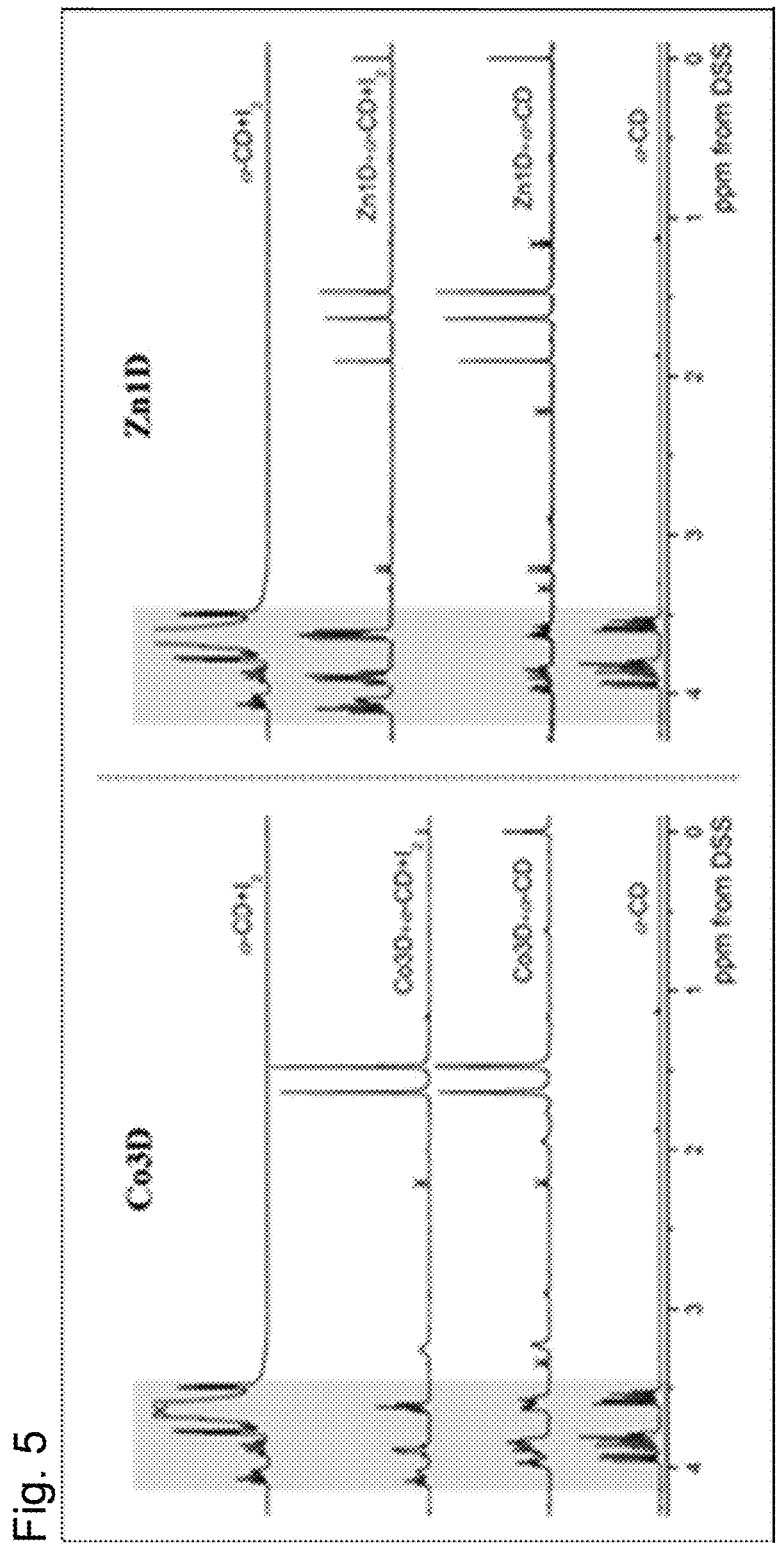
FIG. 5 is a diagram showing the $^1$H-NMR spectra of ionic solids obtained in Examples 10, 16, 19 and 20.

An ionic solid was obtained by the same operation as in Example 19 except that 50 mg of the crystals of Zn1D obtained in Synthesis Example 2 was used. The incorporation of iodine in the obtained ionic solid was analyzed by Raman spectroscopy and $^1$H NMR (D$_2$O) in the same manner as in Example 19. The results are shown in FIGS. 4 and 5. It was confirmed from these analyses that iodine was included in α-cyclodextrin-inclusion Zn1D. Next, the amount of iodine included was examined by use of X-ray fluorescence spectroscopy in the same manner as in Example 19 and was [Co$_2$Au$_3$]:I$_2$=1:0.8.

Example 21

Synthesis of Na$_9$[{Zn(OAc)$_2$}{Co$_2$Au$_3$(D-pen)$_6$}$_3$]·1E·13H$_2$O 20 mg of the crystals of Na$_9$[{Zn(OAc)$_2$}{Co$_2$Au$_3$(D-pen)$_6$}$_3$]·nH$_2$O obtained in Synthesis Example 2 was dipped

TABLE 2

| | Host compound | Hydrophilic substance (guest compound) | | | Solvent (Water/EtOH) | Amount of hydrophilic substance (guest compound) included (mass %) |
|---|---|---|---|---|---|---|
| | | Type | Molecular weight | Concentration M | | |
| Example 13 | Zn1D | Ethylene glycol | 62.07 | — | — | 3.5 |
| Example 14 | Zn1D | Xylitol | 152.15 | 1 | 1/4 | 31.0 |
| Example 15 | Zn1D | Adonitol | 152.15 | 1 | 1/4 | 8.1 |
| Example 16 | Zn1D | α-Cyclodextrin | 972.84 | 0.15 | 1/1 | 36.0 |
| Example 17 | Zn1D | β-Cyclodextrin | 1134.98 | 0.15 | 1/1 | 6.2 |
| Example 18 | Zn1D | γ-Cyclodextrin | 1297.12 | 0.15 | 1/1 | 43.0 |
| Reference Example 3 | Zn1D | Formaldehyde | 30.03 | 10 | Water | 0 |
| Reference Example 4 | Zn1D | Ethanol | 46.07 | 14 | 1/4 | 0 |

Example 19

Synthesis of α-Cyclodextrin-Inclusion Co3D Further Including Iodine (CoD+α-CD+I$_2$)

50 mg of the crystals of Co3D obtained in Synthesis Example 1 was dipped in 0.5 mL of an ethylene glycol solution containing 0.15 mol of α-cyclodextrin dissolved therein, and an ethylene glycol solution containing 0.1 mol of iodine, and left at room temperature for 1 day. Then, the crystals were washed with an aqueous methanol solution to obtain a brownish purple ionic solid. The incorporation of iodine in the obtained ionic solid was analyzed by Raman spectroscopy and $^1$H NMR (D$_2$O). The Raman spectroscopy was performed using NR-1800 manufactured by JASCO Corp. The results are shown in FIGS. 4 and 5. It was confirmed from these analyses that iodine was included in α-cyclodextrin-inclusion Co3D. Next, the amount of iodine included was examined by use of X-ray fluorescence spectroscopy. In the X-ray fluorescence spectroscopy, energy dispersive X-ray fluorescence spectrometer EDX-720 (manufactured by Shimadzu Corp.) was used as an X-ray fluorescence spectroscopic apparatus. The X-ray fluorescence spectroscopy showed [Co$_2$Au$_3$]:I$_2$=1:0.35. The amount of iodine included was determined by observing the in 0.5 mL of ethylene glycol (99.5%) and left at room temperature for 3 days. The resulting purple solid was washed with methanol and dried for several hours to obtain Na$_9$[{Zn(OAc)$_2$}{Co$_2$Au$_3$(D-pen)$_6$}$_3$]·1E·13H$_2$O.

The amount of ethylene glycol included was calculated by the comparison between the integrated intensity of signals (3.65 ppm, 4H) of methylene hydrogen of ethylene glycol and the integrated intensity of signals (1.5 ppm, 18H and 1.6 ppm, 18H) of methyl group hydrogen of a complex anion in $^1$H NMR.

The amount of a Na$^+$ ion was quantified by preparing a calibration curve of $^{23}$Na NMR resonance intensity using standard samples (0.1 mM, 1 mM, 10 mM, and 100 mM NaCl/D$_2$O solution).

Example 22

Synthesis of Na$_9$[{Zn(OAc)$_2$}{Co$_2$Au$_3$(D-pen)$_6$}$_3$]·4E·13H$_2$O

Na$_9$[{Zn(OAc)$_2$}{Co$_2$Au$_3$(D-pen)$_6$}$_3$]·4E·13H$_2$O was obtained by the same operation as in Example 21 except that 0.5 mL of ethylene glycol (99.5%) was used and the crystals dipped therein were left at room temperature for 5 days. The amount of ethylene glycol included was determined in the same manner as in Example 21.

Example 23

Synthesis of $Na_2Cs_7[\{Zn(OAc)_2\}\{Co_2Au_3(D\text{-pen})_6\}_3]\cdot 4EG\cdot 10H_2O$ $Na_3[Co_2Au_3(D\text{-pen})_6]\cdot 13H_2O$ (100 mg) was dissolved in an acetic acid/cesium acetate buffered aqueous solution (5 mL, pH 6, $[OAc^-]$=0.5 M). To this solution, a solution of $Zn(OAc)_2\cdot 2H_2O$ (4.4 mg) dissolved in an acetic acid/cesium acetate buffered aqueous solution (5 mL, pH 6, $[OAc^-]$=0.5 M) was added, and the mixture was stirred at room temperature for 5 minutes to obtain a dark purple solution. This solution was left at room temperature for 3 weeks. Then, purple hexagonal prism-like crystals were collected by filtration to obtain $Na_2Cs_7[\{Zn(OAc)_2\}\{Co_2Au_3(D\text{-pen})_6\}_3]\cdot 0EG$. The isolation yield was 21 mg (20%).

20 mg of the obtained crystals was dipped in 0.5 mL of ethylene glycol (99.5%) and left at room temperature for 3 days. The resulting purple solid was washed with methanol and dried for several hours to obtain $Na_2Cs_7[\{Zn(OAc)_2\}\{Co_2Au_3(D\text{-pen})_6\}_3]\cdot 1EG\cdot 10H_2O$.

The amount of ethylene glycol included and the amount of a $Na^+$ ion were determined in the same manner as in Example 21.

(Measurement of Degree of Ion Conductivity)

The degrees of ion conductivity of the ionic solids obtained in Examples 21 to 23 were measured by a method given below. The ionic solids of Examples 21 and 22 were subjected to a comparative experiment with $Na_9[\{Zn(OAc)_2\}Co_2Au_3(D\text{-pen})_6]\cdot 13H_2O$ including no ethylene glycol as Reference Example 5. The ionic solid of Example 23 was subjected to a comparative experiment with $Na_2Cs_7[\{Zn(OAc)_2\}\{Co_2Au_3(D\text{-pen})_6\}_3]\cdot 10H_2O$ including no ethylene glycol as Reference Example 6.

(1) Preparation of Pellet

Approximately 10 to 20 mg of a specimen in the form of a powder or crystals was packed into a cylindrical cell of 3 mm$\phi$ and retained at a pressure of 5 GPa for 20 minutes or longer to prepare pellets.

(2) Measurement of Ion Conductivity

The obtained pellets were pressure-bonded to SH-Z cell holder manufactured by Toyo Corp. The whole cell holder connected with a cable was left standing inside a thermostat with its humidity and temperature adjusted. In this state, alternating current impedance measurement using the pseudo 4-terminal method was carried out in a frequency range from 500 kHz to 20 Hz using Wayne Kerr 6430B Component Analyzer. A Nyquist plot as to the obtained alternating current impedance was prepared with the real part (Z') on the abscissa against the imaginary part (Z") on the ordinate. As a result, the shape of a semicircle derived from bulk ion conduction was observed. Its diameter was regarded as bulk resistance (R) derived from ion conduction, and the resistivity of the whole specimen was calculated. Table 3 shows results of measuring the ion conductance rate ($\sigma$/S cm$^{-1}$) of each sample under conditions of 25° C. and 69% RH.

TABLE 3

| | $\sigma(Scm^{-1})$ | $Log_{10}(\sigma/Scm^{-1})$ |
|---|---|---|
| Example 21 | $3.9 \times 10^{-6}$ | −5.41 |
| Example 22 | $2.4 \times 10^{-4}$ | −3.26 |
| Reference Example 5 | $1.3 \times 10^{-6}$ | −5.87 |

TABLE 3-continued

| | $\sigma(Scm^{-1})$ | $Log_{10}(\sigma/Scm^{-1})$ |
|---|---|---|
| Example 23 | $1.7 \times 10^{-4}$ | −3.77 |
| Reference Example 6 | $3.6 \times 10^{-6}$ | −4.44 |

Example 24

Synthesis of $[Ni(H_2O)_6]_3[Co_2Au_3(D\text{-pen})_6]_2\cdot nH_2O$ (Hereinafter, Also Referred to as "Ni3D")

Figure 6:
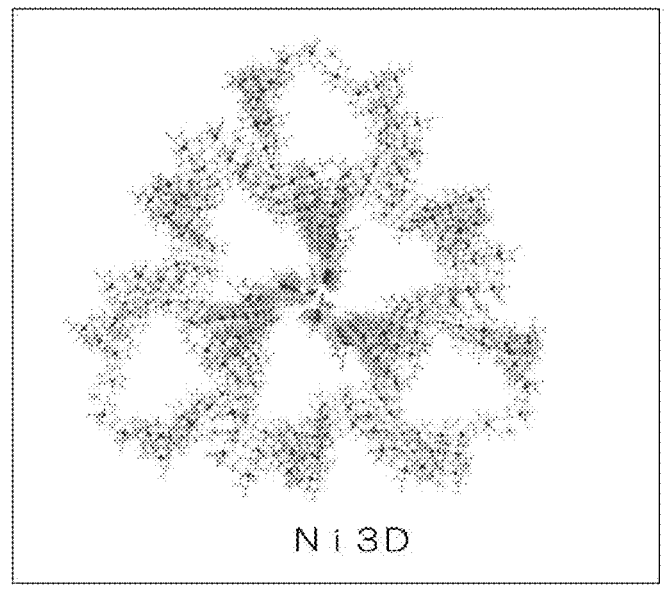
FIG. 6 is a diagram showing the crystal structure of an ionic solid obtained in Example 24.

To a purple solution containing $Na_3[Co_2Au_3(D\text{-pen})_6]\cdot 13H_2O$ (100 mg, 0.0602 mmol) in $H_2O$ (4 mL), a green solution containing $Ni(OAc)_2\cdot 4H_2O$ (26 mg, 0.09 mmol) in water (1 mL) was added. The mixture was stirred at room temperature for several minutes and then left at room temperature for 1 day. The obtained purple plate-like crystals were collected by filtration. The obtained crystals were confirmed by X-ray analysis to be an ionic solid of the chemical formula. FIG. 6 shows the crystal structure of the ionic solid. The isolation yield was 21 mg (20%). The pores of Ni3D had an opening size of 3.5 nm and porosity of 80%.

Example 25

Synthesis of $[Mn(H_2O)_6]_3[Co_2Au_3(D\text{-pen})_6]_2\cdot nH2O$ (Hereinafter, Also Referred to as "Mn3D")

To a purple solution containing $Na_3[Co_2Au_3(D\text{-pen})_6]\cdot 13H_2O$ (100 mg, 0.0602 mmol) in $H_2O$ (1 mL), a light pink solution containing $Mn(OAc)_2\cdot 4H_2O$ (22 mg, 0.09 mmol) in water (1 mL) was added. The mixture was stirred at room temperature for several minutes and then left at room temperature for 3 days. The obtained purple plate-like crystals were collected by filtration. The obtained crystals were confirmed by X-ray analysis to be an ionic solid of the chemical formula. The isolation yield was 15 mg (15%). The pores of Mn3D had an opening size of 3.5 nm and porosity of 80%.

Example 26

Synthesis of $[Ni(H_2O)_6]_2[Ni(H_2O)_4][Co_2Au_3(D\text{-pen})_6]_2\cdot nH_2O$ (Hereinafter, Also Referred to as "Ni1D")

Figure 7:
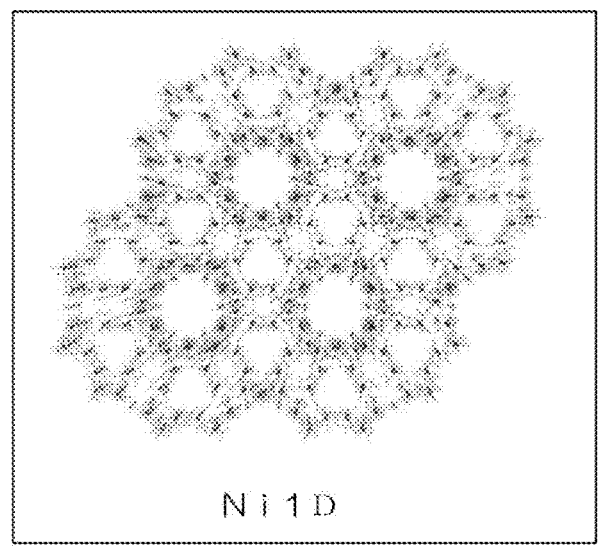
FIG. 7 is a diagram showing the crystal structure of an ionic solid obtained in Example 26.

To a purple solution containing $Na_3[Co_2Au_3(D\text{-pen})_6]\cdot 13H_2O$ (50 mg, 0.0301 mmol) in $H_2O$ (2.5 mL), a green solution containing $Ni(OAc)_2\cdot 4H_2O$ (11 mg, 0.045 mmol) in water (2.5 mL) was added. The mixture was stirred at room temperature for several minutes and then left at room temperature for 3 days. The obtained purple hexagonal prism-like crystals were collected by filtration. The obtained crystals were confirmed by X-ray analysis to be an ionic solid of the chemical formula. FIG. 7 shows the crystal structure of the ionic solid. The isolation yield was 21 mg (35%). The pores of Ni1D had an opening size of 2 nm and porosity of 60%.

Example 27

Synthesis of $[Mn(H_2O)_6]_2[Mn(H_2O)_4][Co_2Au_3(D\text{-pen})_6]_2\cdot nH_2O$ (hereinafter, also referred to as "Mn1D")

To a purple solution containing $Na_3[Co2Au_3(D\text{-pen})_6]\cdot 13H_2O$ (50 mg, 0.0301 mmol) in $H_2O$ (2.5 mL), a light pink solution containing $Mn(OAc)_2\cdot 4H_2O$ (11 mg, 0.045 mmol) in water (2.5 mL) was added. The mixture was stirred at room temperature for several minutes and then left at room temperature for 3 days. The obtained purple hexagonal prism-like crystals were collected by filtration. The obtained crystals were confirmed by X-ray analysis to be an ionic solid of the chemical formula. The isolation yield was 23 mg (39%). The pores of Mn1D had an opening size of 2 nm and porosity of 60%.

Study for Gas Adsorbent Material

Example 28

Figure 8:
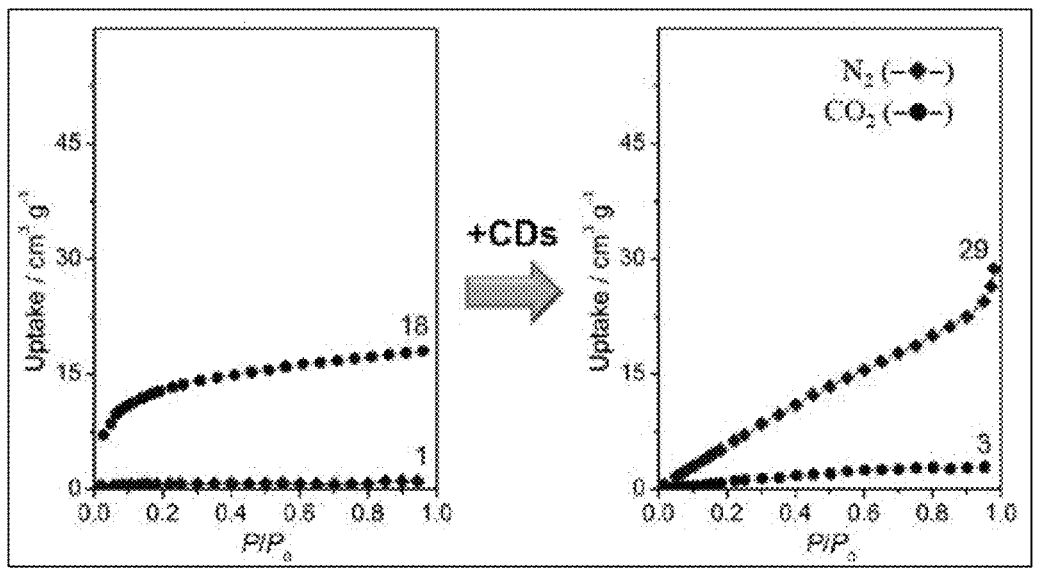
FIG. 8 is a diagram showing the performance as a gas adsorbent material of ionic solids obtained in Example 10 and Synthesis Example 2.

The amounts of nitrogen and carbon dioxide adsorbed were measured by using α-cyclodextrin-inclusion Co3D (CoD+α–CD) obtained in Example 10 and Co3D obtained in Synthesis Example 2 as samples. For the measurement, 10 mg of each sample was weighed and retained for 2 hours under conditions involving a temperature of 120° C. and a pressure of 0.1 Pa, followed by the measurement of nitrogen adsorption and carbon dioxide adsorption at 77 K and 200 K, respectively, using BELSORP-max manufactured by MicrotracBEL Corp. The results are shown as amounts adsorbed per [$Co_2Au_3$] at the pressure at the time of measurement with respect to normal pressure, P/P0, in FIG. 8. As is evident from FIG. 8, the inclusion of α-cyclodextrin in Co3D improves the ability to adsorb nitrogen and carbon dioxide.

Study for Solvent Vapor Adsorbent Material

Example 29

Figure 9:
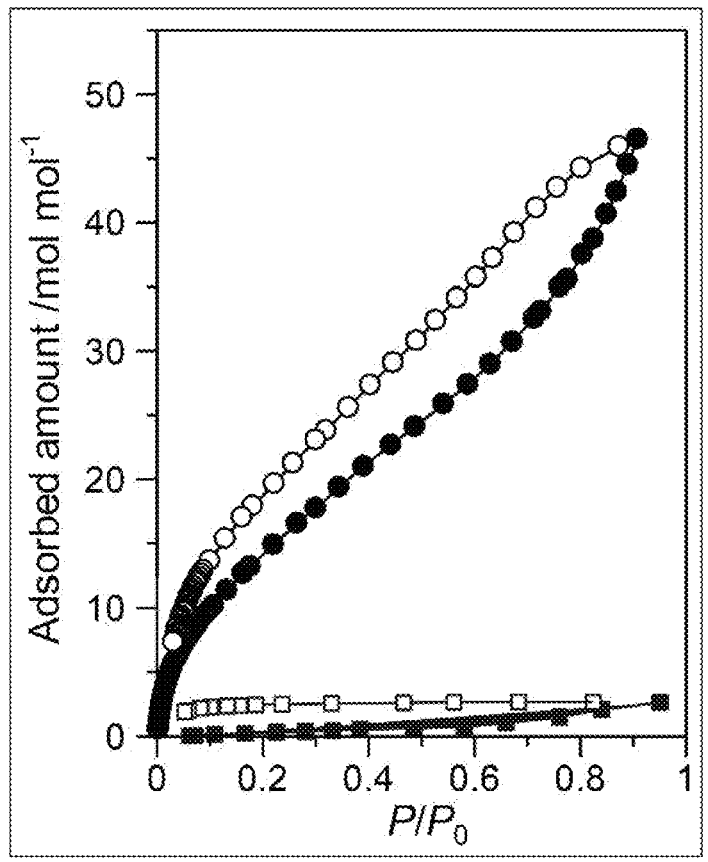
FIG. 9 is a diagram showing the performance as a solvent vapor adsorbent material of an ionic solid obtained in Example 25.

The amounts of ethanol vapor and water vapor adsorbed were measured by using Mn3D obtained in Example 25 as a sample. For the measurement, 10 mg of the sample was weighed and retained for 2 hours under conditions involving normal temperature and a pressure of 0.1 Pa, followed by the measurement of ethanol vapor and water vapor adsorption at 298 K using BELSORP-max manufactured by Microtrac-BEL Corp. The results are shown as amounts adsorbed per [$Co_2Au_3$] at the pressure at the time of measurement with respect to normal pressure, P/P0, in FIG. 9. In FIG. 9, the solid circle depicts the adsorption of water vapor, the open circle depicts the desorption of water vapor, the solid square depicts the adsorption of ethanol vapor, and the open square depicts the desorption of ethanol vapor. As is evident from FIG. 9, ethanol vapor is rarely adsorbed, whereas water vapor can be selectively absorbed and is also easily desorbed.

Example 30

(1) Synthesis of [[$Au_6Cu_3$(tdme)$_2$(D-pen)$_6$]$_{12}Cu_8$](NO$_3$)$_{16}$·25Cu(NO$_3$)$_2$·324H$_2$O 2.5 g of tetrachloroauric(III) acid was dissolved in 50 mL of a water/methanol mixed solvent (2:3). To this solution, a solution containing 2.3 mL of 2,2'-thiodiethanol dissolved in 2.5 mL of methanol was added to prepare a colorless solution. When a solution containing 1.3 g of tdme (1,1,1-tris(diphenylphosphinomethyl)ethane)) dissolved in 25 mL of a chloroform/methanol mixed solvent (4:1) was added to the prepared colorless solution, a white solid was immediately deposited. The mixture was stirred at room temperature for 6 hours in the dark. Then, 100 mL of cold methanol was added thereto, and the mixture was left standing for 1 day in the dark, then filtered, washed with 250 mL, and dried under reduced pressure to obtain 2.6 g of a white solid of [Au$_3$(tdme)Cl$_3$]. The isolation yield was 96%.

Subsequently, 2.00 g of [Au$_3$(tdme)Cl$_3$] was suspended in 100 mL of ethanol. To this suspension, 0.68 g of D-penicillamine (D-pen) was added, and the mixture was stirred at room temperature for 1 hour. Unreacted [Au$_3$(tdme)Cl$_3$] that slightly remained undissolved was filtered off. To the obtained colorless solution, 45 mL of a 0.10 M aqueous sodium hydroxide solution was added. This solution was concentrated to dryness, and the obtained white powder was washed three times with 40 mL of water and dried under reduced pressure to obtain 2.37 g of a product [Au$_3$(tdme)($_D$-pen)$_3$]5H$_2$O. The isolation yield was 90%. The structure of the obtained product [Au$_3$(tdme)($_D$-pen)$_3$]5H$_2$O was confirmed by $^1$H-NMR, $^{31}$P-NMR, IR and elemental analysis.

$^1$H-NMR spectrum (ppm from TMS, methanol-d$_4$): δ0.99 (s, 3H), 1.33 (s, 9H), 1.67 (s, 9H), 3.47 (s, 3H), 7.53-7.54 (m, 18H), 7.65-7.70 (m, 6H), 7.76-7.80 (m, 6H)

$^{31}$P-NMR spectrum (ppm from H$_3$PO$_4$, methanol-d$_4$): δ 22.1 (s)

IR spectrum (cm$^{-1}$, KBr disk): 1627 (COO-)

Anal. Calcd for [Au$_3$(tdme)(D-Hpen)$_3$]·5H$_2$O=C$_{56}$H$_{79}$N$_3$O$_{11}$P$_3$S$_3$Au$_3$: C, 38.43; H, 4.55; N, 2.40%. Found: C, 38.34; H, 4.49; N, 2.38%.

Further, 1.00 g of [Au$_3$(tdme)(D-pen)$_3$] was suspended in 100 mL of ethanol. To this suspension, 17.2 mL of a 0.1 M aqueous sodium hydroxide solution and 17.2 mL of a 0.1 M aqueous cadmium nitrate solution were added, and the mixture was stirred at room temperature for 6 hours. As a result, a colorless solution was obtained. This solution was concentrated until the whole amount became 50 mL, and naturally concentrated at room temperature for several days to obtain 0.83 g of [[Au$_6$Cd$_3$(tdme)$_2$(D-pen)$_6$]$_{12}$Cd$_4$Na)$_4$](NO$_3$)$_{12}$·4Cd(NO$_3$)$_2$·432H$_2$O as colorless crystals. The isolation yield was 64%.

Next, the colorless crystals thus obtained were dipped in a 1 M aqueous copper nitrate solution for 5 days. As a result, an ionic solid was obtained as green crystals [[Au$_6$Cu$_3$(tdme)$_2$(D-pen)$_6$]$_{12}$Cu)$_8$](NO$_3$)$_{16}$·25Cu(NO$_3$)$_2$·324H$_2$O (hereinafter, referred to as a "116-nuclear complex"). The pores of the ionic solid had an opening size of 0.8 nm and porosity of 40%.

As a result of using 1 M cobalt nitrate instead of the 1 M aqueous copper nitrate solution described above, an ionic solid of [[Au$_6$Co$_3$(tdme)$_2$(D-pen)$_6$]12Co$_8$](NO$_3$)$_{16}$·25Co(NO$_3$)$_2$·324H$_2$O was obtained. The pores of this ionic solid had an opening size of 0.9 nm and porosity of 41.9%.

(2) Crystal Structure Analysis

Single-crystal X-ray diffraction was carried out for good-quality single crystals of (1). In the crystals, a gold trinuclear complex unit ([Au$_3$(tdme)(D-pen)$_3$]$^{3-}$) was formed which had a structure where three [Au(D-pen)]$^-$ units, in which the sulfur atom of the D-pen ligand was linked to a gold ion, were cross-linked to the tripod phosphine ligand tdme. Further, two such gold trinuclear complex units were cross-linked to three copper(II) ions using the $_D$-pen moiety to form a Au$_6$Cu$_3$ nonanuclear complex ([Au$_6$Cu$_3$(tdme)$_2$(D-pen)$_6$]). The coordination environments around the copper ions were disordered at a ratio of 1:1 into two types, a N2S2 planar tetracoordinate structure and a NOS2 planar tetracoordinate structure. Two carboxyl groups of D-pen in the Au$_h$Cu$_3$ nonanuclear complex described above were coordinated to the copper ions, and the copper ions linked three Au$_6$Cu$_3$ nonanuclear complexes. Further, a total of 12 Au$_6$Cu$_3$ nonanuclear complexes were linked through eight copper ions to form a spherical Au$_{72}$Cu$_{44}$ 116-nuclear complex. Nitrate anions as counter anions were present in voids surrounded by phenyl groups on the outer surface of the complex. This Au$_{72}$Cu$_{44}$ 116-nuclear complex had simple cubic lattice arrangement. Large pores were present in the voids of the sphere, and the pores were filled with hydrated copper and water molecules.

Study for Material Providing a Reaction Field
(1) Incorporation of Oxometallic Ion in 116-Nuclear Complex

Example 31

Figure 10:
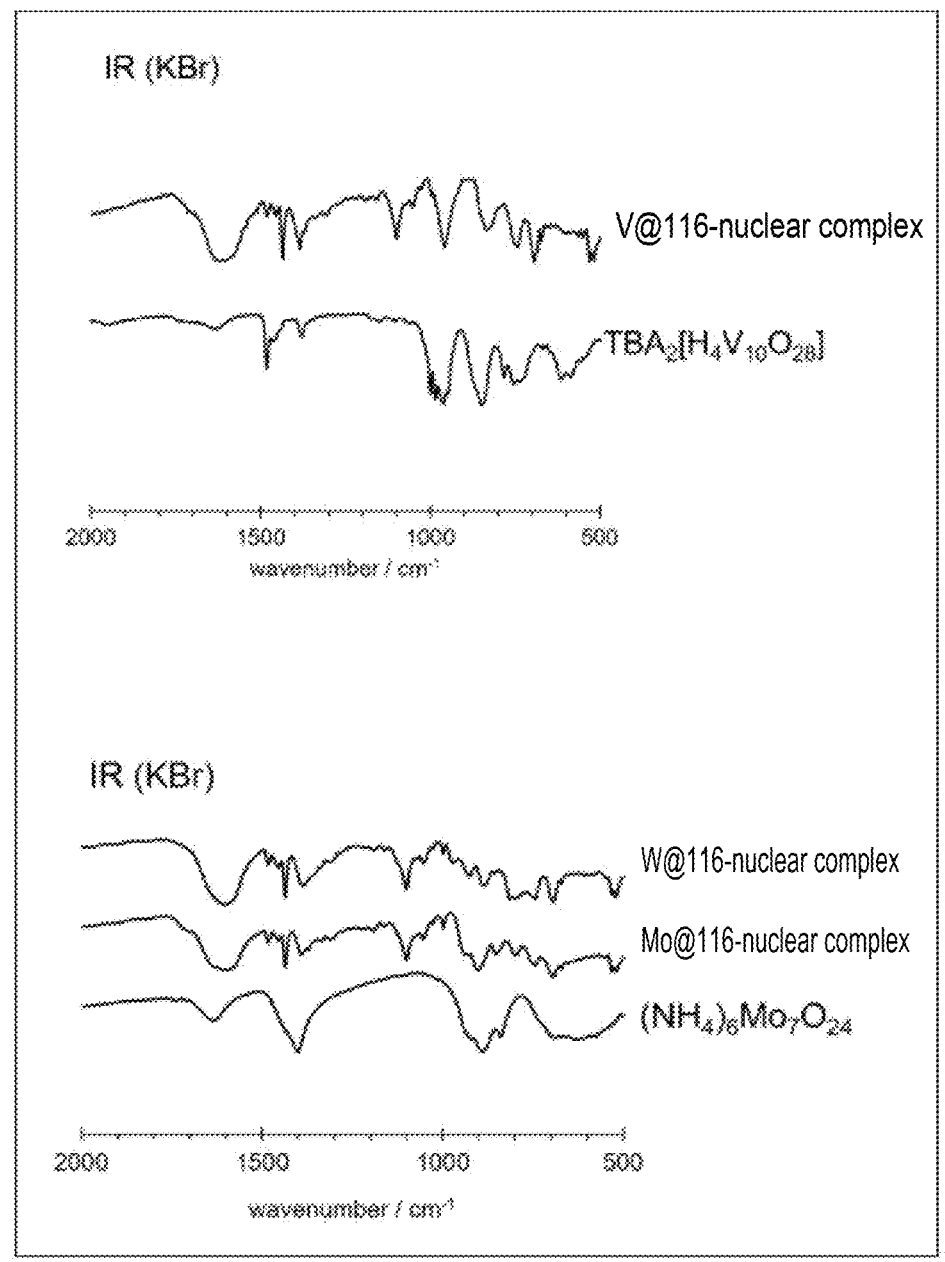
FIG. 10 is a diagram showing the IR spectra of ionic solids obtained in Examples 31 to 33.

The 116-nuclear complex obtained in Example 30 was dipped overnight in a 0.4 M aqueous sodium molybdate solution, and crystals were collected by filtration. From the IR spectrum of the obtained crystals, peak intensity derived from nitrate anions was weakened, whereas a peak derived from molybdate ions was strongly detected, as compared with a spectrum before dipping, suggesting that anion exchange occurred. Further, a decreased number of nitrate anions was also confirmed from CHN elemental analysis. FIG. 10 shows the IR spectrum.

Example 32

Crystals were collected by the same operation as in Example 31 except that sodium tungstate was used instead of aqueous sodium molybdate. An IR spectrum was measured in the same manner as in Example 31. The results are shown in FIG. 10.

Example 33

Crystals were collected by the same operation as in Example 31 except that sodium vanadate was used instead of aqueous sodium molybdate. An IR spectrum was measured in the same manner as in Example 31. The results are shown in FIG. 10.

(2) Condensation Reaction within Pore of 116-Nuclear Complex

Example 34

Figure 11:
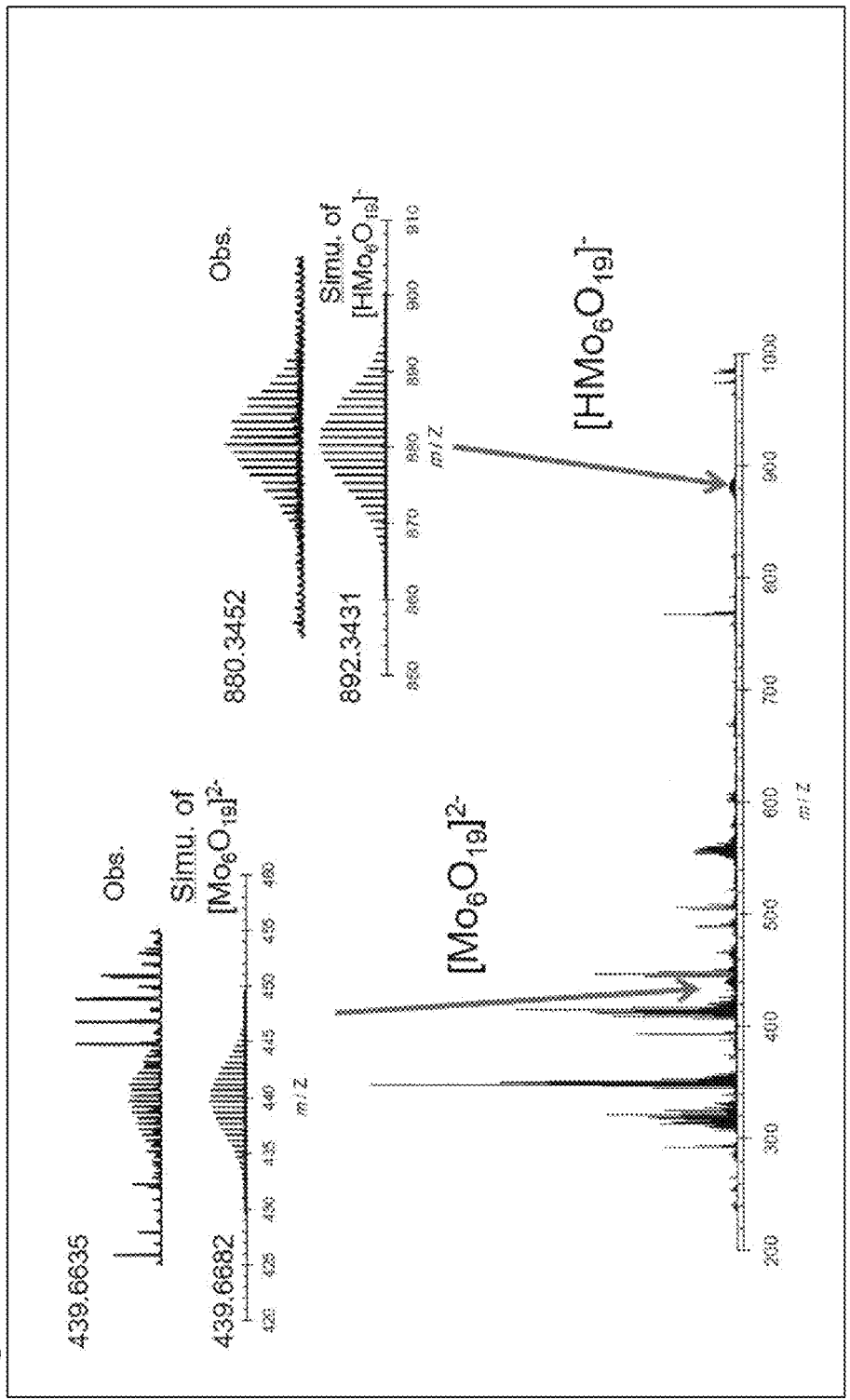
FIG. 11 is a diagram showing the ESI-mass spectrum of an ionic solid obtained in Example 34.

The 116-nuclear complex obtained in Example 30 was dipped overnight in a 0.4 M aqueous sodium molybdate solution. After the dipping, 1 M nitric acid was added to the reaction solution, and the mixture was left standing overnight. From X-ray fluorescence, gold, copper and molybdenum were detected. From an IR spectrum, a peak derived from mononuclear molybdate before reaction disappeared, and a peak corresponding to $MnO_6O_{19}^{2-}$ was newly detected. The crystals were dissolved in acetonitrile, followed by ESI-mass spectrometry. As a result, signals corresponding to $Mo_6O_{19}^{2-}$ and $HMo_6O_{19}^-$ were observed. The results are shown in FIG. 11.

Figure 12:
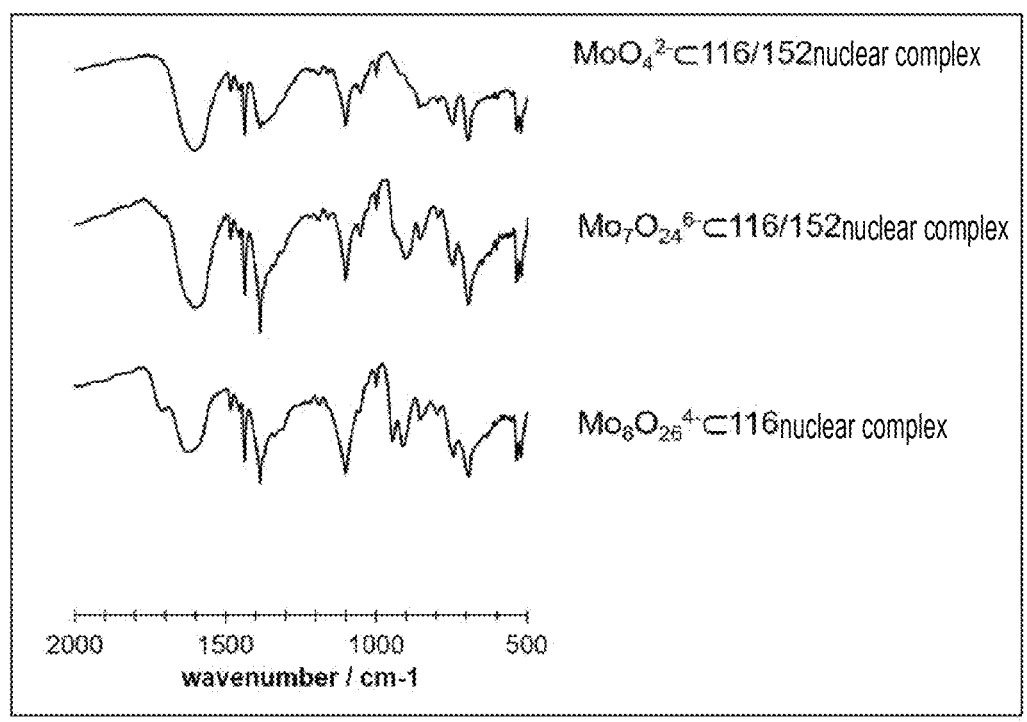
FIG. 12 is a diagram showing the IR spectrum of an ionic solid obtained in Example 34.

After the dipping, 1 M nitric acid was added to the reaction solution, and the mixture was left standing overnight (pH 5 to 7), in the same manner as above. As a result, $Mo_7O_{24}^{6-}$ was produced. Further, 1 M nitric acid was added thereto, and the mixture was left standing overnight (pH 1 to 2). As a result, $\beta\text{-}Mo_8O_{26}^{4-}$ was produced. This was able to be confirmed by the IR analysis shown in FIG. 12.

(3) Oxidation Reaction Using Polyacid-Inclusion 116-Nuclear Complex

Example 35

Figure 13:
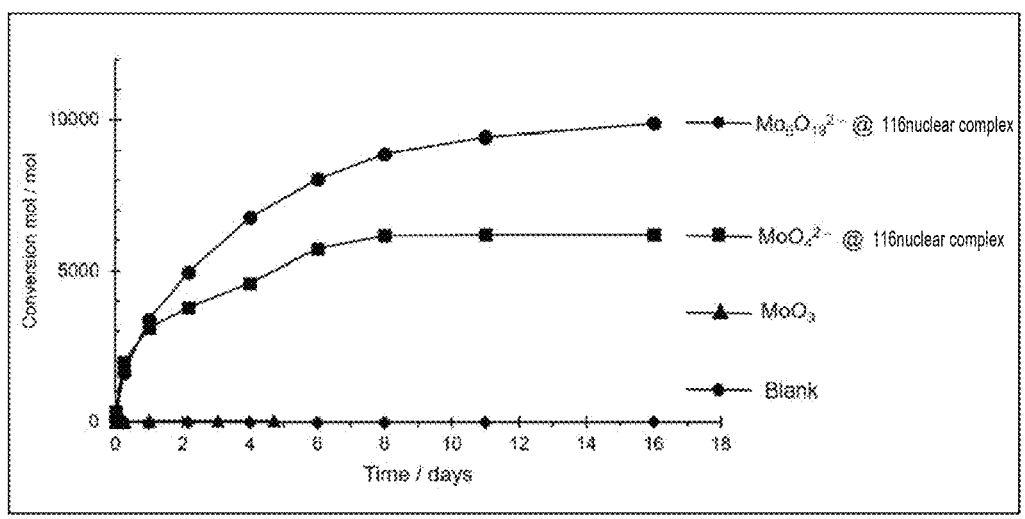
FIG. 13 is a diagram showing the performance as a material providing a reaction field of an ionic solid obtained in Example 35.

To 0.5 mg of a condensed molybdate-inclusion 116-nuclear complex ($Mo_6O_{19}^{2-}$@116-nuclear complex) and 500 μL of a deuterated acetonitrile solvent, 5 μL of DMSO serving as a substrate and 20 μL (2.5 equivalents) of hydrogen peroxide water serving as an oxidizing agent were added. The resulting solution was placed in a NMR tube. The reaction solution was preserved at room temperature, and $^1$H-NMR was measured at intervals of a given time (ECA500 manufactured by JEOL RESONANCE Inc.). A reaction conversion rate was calculated from the integrated intensity ratio between peaks of the methyl groups of DMSO and $DMSO_2$. As shown in Table 4, the same operation was also performed as to a molybdate-inclusion ionic solid ($MoO_4^{2-}$@116-nuclear complex), etc. Time-dependent change in amount converted per catalyst active point was plotted. The results are shown in FIG. 13.

In the description above, the 116-nuclear complex means $[[Au_6Cu_3(tdme)_2(D\text{-}pen)_6]_{12}Cu)_8](NO_3)_{16}$.

Figure 14:
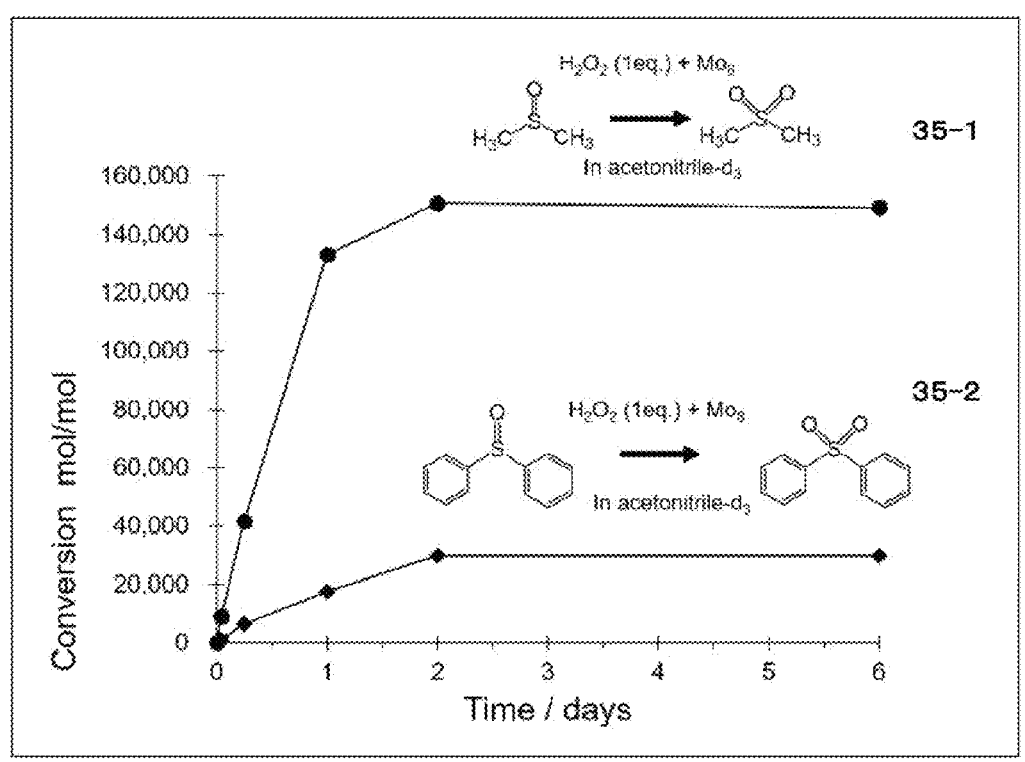
FIG. 14 is a diagram showing the performance as a material providing a reaction field of an ionic solid obtained in Example 35.
Figure 15:
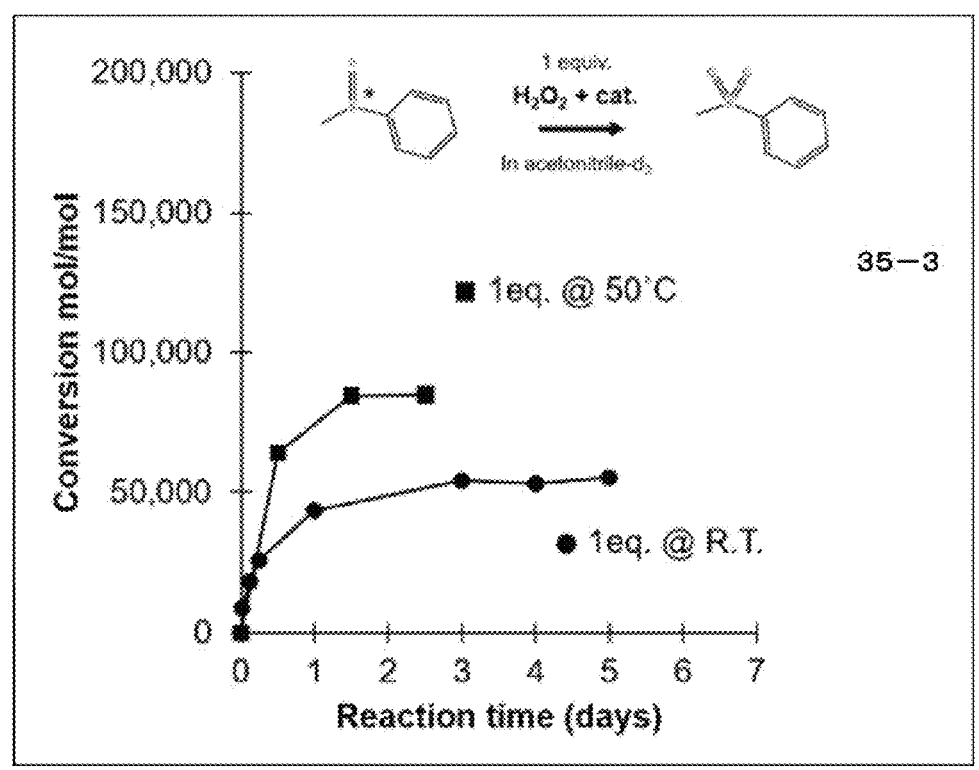
FIG. 15 is a diagram showing the performance as a material providing a reaction field of an ionic solid obtained in Example 35.
Figure 16:
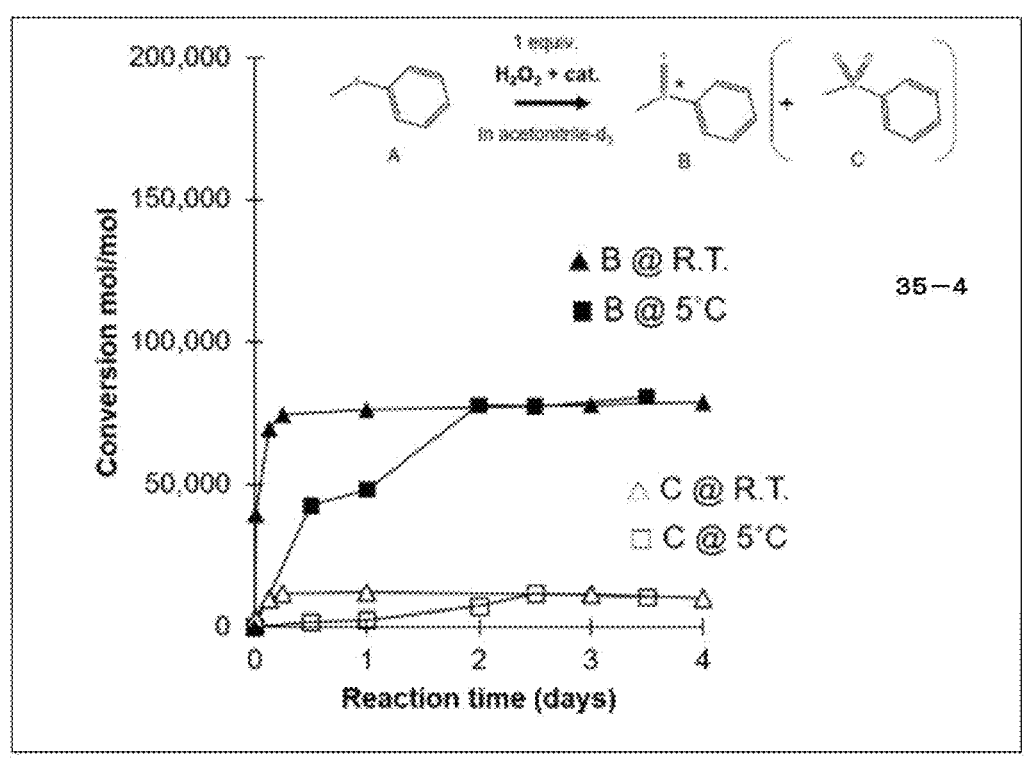
FIG. 16 is a diagram showing the performance as a material providing a reaction field of an ionic solid obtained in Example 35.

The same measurement as above was performed as to each substrate shown in Table 5. The results are shown in FIGS. 14 to 16.

TABLE 4

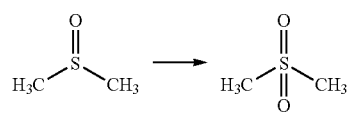

| | cat. | | acetonitrile | DMSO | | H₂O₂ | | equiv. per |
|---|---|---|---|---|---|---|---|---|
| | mg | mol | μL | μL | mol | μL | mol | DMSO |
| $MoO_4^{2-}$-@ 116-nuclear complex | 0.5 | $9.2 \times 10^{-9}$ | 500 | 5 | $7.0 \times 10^{-5}$ | 20 | $1.8 \times 10^{-4}$ | 2.5 |
| $Mo_6O_{19}^{2-}$-@ 116-nuclear complex | 0.36 | $7.1 \times 10^{-9}$ | 500 | 5 | $7.0 \times 10^{-6}$ | 20 | $1.8 \times 10^{-4}$ | 2.5 |
| Blank | — | — | 350 | 3.5 | $4.9 \times 10^{-5}$ | 14 | $1.2 \times 10^{-4}$ | 2.5 |
| $MoO_3$ | 0.2 | $1.4 \times 10^{-6}$ | 500 | 5 | $7.0 \times 10^{-6}$ | 20 | $1.8 \times 10^{-4}$ | 2.5 |

TABLE 5

| | | cat. | | acetonitrile | substrate | | | H$_2$O$_2$ | | | |
| --- | --- | --- | --- | --- | --- | --- | --- | --- | --- | --- | --- |
| | | mg | mol | μL | — | μL | mol | μL | mol | equiv. per substrate | temp. |
| 35-1 | Mo$_8$O$_{26}$$^{4-}$@[116-nuclear complex] | 0.6 | $1.0 \times 10^{-8}$ | 1000 | dimethyl sulfoxide | 100 | $1.4 \times 10^{-3}$ | 150 | $1.5 \times 10^{-3}$ | 1.1 | 50° C. |
| 35-2 | Mo$_8$O$_{26}$$^{4-}$@[116-nuclear complex] | 0.6 | $1.0 \times 10^{-8}$ | 1000 | diphenyl sulfoxid | 110 | $6.0 \times 10^{-4}$ | 62 | $6.0 \times 10^{-4}$ | 1.0 | 50° C. |
| 35-3 | Mo$_8$O$_{26}$$^{4-}$@[116-nuclear complex] | 0.54 | $8.7 \times 10^{-9}$ | 1000 | methylphenyl sulfoxid | 100 | $1.4 \times 10^{-3}$ | 80 | $7.8 \times 10^{-4}$ | 0.9 | 50° C. |
| 35-4 | Mo$_8$O$_{26}$$^{4-}$@[116-nuclear complex] | 0.57 | $9.7 \times 10^{-9}$ | 900 | methylphenyl sulfide | 100 | $8.4 \times 10^{-4}$ | 90 | $8.8 \times 10^{-4}$ | 1.0 | 50° C. |
| | Blank | — | — | 350 | — | 3.5 | $4.9 \times 10^{-5}$ | 14 | $1.2 \times 10^{-4}$ | 2.5 | 50° C. |
| | MoO$_3$ | 0.2 | $1.4 \times 10^{-6}$ | 500 | — | 5 | $7.0 \times 10^{-4}$ | 20 | $1.8 \times 10^{-4}$ | 2.5 | 50° C. |

The invention claimed is:

1. An ionic solid, comprising:
    a metal complex comprising (A) an anionic metal complex and (B) a cationic species, arranged through a coordination bond or an ionic bond into a crystal lattice;
    pores, suitable for incorporating a guest compound, formed by the crystal lattice; and
    a hydrophilic substance having a molecular weight of 60 or larger comprised in the pores as the guest compound,
    wherein the hydrophilic substance is at least one selected from the group consisting of a polyhydric alcohol, a cyclic oligosaccharide, a saccharide, and a sugar alcohol,
    wherein the anionic metal complex (A) has formula (1):

$$[(M^1)_d(M^2)_e(X^1)_f]^{k-} \quad (1),$$

$M^1$ independently being a group 9 metal element, $M^2$ independently being a group 11 metal element, $X^1$ being an amino acid having a thiol group, d and 3 independently being a number in a range of from 0 to 4, provided d and e are not simultaneously 0, f being a number in a range of from 1 to 8, and k being a number in a range of from 1 to 4, and
    wherein the cationic species (B) has formula (2):

$$A_a[(M^3)_l(X^2)_m]^{j} \quad (2),$$

A being an alkali metal ion or an alkaline earth metal ion, $M^3$ being a group 9 or 12 metal element, each $X^2$ independently being water, ammine, diamine, a nitrite ion, and/or carboxylate, a being a number in a range of from 0 to 10, l being a number in a range of from 0 to 1, provided that a and l are not simultaneously 0, m being a number in a range of from 1 to 6, and j being a number in a range of from 1 to 3.

2. The ionic solid of claim 1, wherein the hydrophilic substance
    comprises the cyclic oligosaccharide.

3. The ionic solid of claim 1, wherein the pores occupy 40% or more in the crystal lattice.

4. The ionic solid of claim 1, wherein an opening size of the pores is in a range of from 0.5 to 5 nm.

5. The ionic solid of claim 1, wherein the anionic metal complex (A) is an $M^1M^2$ pentanuclear complex anion in which two metals $M^1$ and three metals $M^2$ are bonded via one ligand,
    wherein the two metals $M^1$ are independently group 9 metal element, and
    wherein the three metals $M^2$ are independently a group 11 metal elements.

6. The ionic solid of claim 5, wherein the ligand is an amino acid having a thiol group.

7. The ionic solid of claim 1, wherein the cationic species (B) comprises a cationic metal complex.

8. The ionic solid of claim 7, wherein the cationic metal complex is:
    [Co(NH$_3$)$_6$]$^{3+}$, [Co(H$_2$O)(NH$_3$)$_5$]$^{3+}$, [Co(NO$_2$)(NH$_3$)$_5$]$^{2+}$, [Co(H$_2$O)$_6$]$^{2+}$, [Ni(H$_2$O)$_6$]$^{2+}$, [Mn(H$_2$O)$_6$]$^{2+}$, [Co(H$_2$O)$_4$]$^{2+}$, [Ni(H$_2$O)$_4$]$^{2+}$, [Mn(H$_2$O)$_4$]$^{2+}$, {Li[Zn(OAc)$_2$]}$^+$, {Na[Zn(OAc)$_2$]}$^+$, {K[Zn(OAc)$_2$]}$^+$, {Cs[Zn(OAc)$_2$]}$^+$, {Na$_2$Cs$_7$[Zn(OAc)$_2$]}$^{9+}$, {Na$_9$[Zn(OAc)$_2$]}$^{9+}$, [Co(en)$_3$]$^{3+}$, and/or [Co(tn)$_3$]$^{3+}$
    wherein OAc is an acetate ion, en is ethylenediamine, and tn is 1,3-diaminopropane.

9. The ionic solid of claim 1, wherein the crystal lattice comprises a metal complex of formula (3):

$$[(M^1)_3(M^2)_2(X^1)_6]_2[(M^3)(X^2)_{m1}]_3 \cdot nH_2O \quad (3),$$

wherein
    $M^1$ is independently a group 9 metal element,
    $M^2$ is independently a group 11 metal element,
    $M^3$ is independently a group 9 or 12 metal element,
    $X^1$ is independently an amino acid having a thiol group,
    $X^2$ is independently water, ammine, diamine, and/or carboxylate,
    m1 is a number in a range of from 1 to 6, and
    n is a number in a range of from 1 to 100.

10. The ionic solid of claim 1, wherein the crystal lattice comprises a metal complex of formula (4):

$$(A)_a[(M^1)_3(M^2)_2(X_1)_6]_b[(M^3)_l(X^2)_{m2}]_c \cdot nH_2O \quad (4),$$

wherein
    $M^1$ is independently a group 9 metal element,
    $M^2$ is independently a group 11 metal element,
    $M^3$ is independently a group 9 or 12 metal element,
    $X^1$ is independently an amino acid having a thiol group,
    $X^2$ is independently water, ammine, diamine, a nitrite ion and carboxylate,
    A is independently an alkali metal ion or an alkaline earth metal ion,
    a is a number in a range of from 0 to 10,
    b is a number in a range of from 1 to 3,
    c is a number in a range of from 1 to 3,
    l is a number in a range of from 0 to 1,
    m2 is a number in a range of from 1 to 6, and
    n is a number in a range of from 1 to 100.

11. The ionic solid of claim 1, wherein the crystal lattice comprises a metal complex of formula (5):

$$(A)_9[(M^1)_3(M^2)_2(X^1)_6]_3[(M^3)(X^2)_{m3}]_2 \cdot nH_2O \quad (5),$$

wherein $M^1$ is independently a group 9 metal element,

M2 is independently a group 11 metal element,

M3 is independently a group 9 or 12 metal element, $X^1$ is independently an amino acid having a thiol group, $X^2$ is independently water, ammine, diamine, and/or carboxylate, each A independently represents an alkali metal ion or an alkaline earth metal ion, m3 is a number in a range of from 1 to 6, and n is a number in a range of from 1 to 100.

12. The ionic solid of claim 1, wherein the ionic solid exhibits bulk ion conductivity.

13. The ionic solid of claim 1, wherein the pores have an opening size in a range of from 0.5 to 5 nm, wherein the molecular weight of the hydrophilic substance is in a range of from 60 to 1600 g/mol, wherein the metal complex is $[Na_{10}(OAc)(H_2O)_3O][Co_2Au_3(D\text{-pen})]_3 \cdot nH_2O$ (Co3D) or $Na_9[\{Zn(OAc)_2\}\{Co_2Au_3(D\text{-pen})_6\}_3]\cdot nH_2O$ (Zn1D), and wherein the hydrophilic substance is present in a range of from 6.3 to 68.0 mass % in the pores of the Co3D as the guest compound, calculated according to formula (i), or the hydrophilic substance is present in a range of from 3.5 to 43.0 mass % in the pores of the Zn1D, calculated according to formula (ii):

$$M_I = 100 \times (P \times Q)/(1842.5 + (P \times Q)) \quad \text{(i)}$$

$$M_I = 100 \times (P \times Q)/(1721.5 + (P \times Q)) \quad \text{(ii)},$$

$M_I$ being the mass of the guest compound included in percentage, P being the molecular weight of the hydrophilic substance guest compound, and Q being a number of molecules of the hydrophilic substance as the guest compound.

14. The ionic solid of claim 1, wherein the hydrophilic substance comprises the polyhydric alcohol.

15. The ionic solid of claim 1, The ionic solid of claim 1, wherein the hydrophilic substance comprises α, β, and/or γ-cyclodextrin.

16. An electrochemical device, a material providing a reaction field, a gas adsorbent material, a solvent vapor adsorbent material, a molecular recognition material, a metal ion exchanger, or an anion exchanger, comprising:

the ionic solid of claim 1.

17. A column packing material, comprising:

the ionic solid of claim 1.

18. A catalyst support, comprising:

the ionic solid of claim 1.

* * * * *